(12) United States Patent
Thomas et al.

(10) Patent No.: US 10,154,308 B2
(45) Date of Patent: *Dec. 11, 2018

(54) METHODS AND SYSTEMS FOR AUTOMATICALLY EVALUATING AN AUDIO DESCRIPTION TRACK OF A MEDIA ASSET

(71) Applicant: Rovi Guides, Inc., San Carlos, CA (US)

(72) Inventors: William L. Thomas, Evergreen, CO (US); Ajit Shanware, Cupertino, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/685,126

(22) Filed: Aug. 24, 2017

(65) Prior Publication Data

US 2018/0035163 A1 Feb. 1, 2018

Related U.S. Application Data

(63) Continuation of application No. 15/223,847, filed on Jul. 29, 2016, now Pat. No. 9,774,911.

(51) Int. Cl.

| H04N 7/16 | (2011.01) |
| H04N 21/442 | (2011.01) |
| G10L 25/51 | (2013.01) |
| H04N 21/233 | (2011.01) |
| H04N 21/234 | (2011.01) |

(Continued)

(52) U.S. Cl.
CPC ... *H04N 21/44213* (2013.01); *G06F 17/2795* (2013.01); *G10L 25/51* (2013.01); *H04N 21/233* (2013.01); *H04N 21/234* (2013.01); *H04N 21/234318* (2013.01); *H04N 21/435* (2013.01); *H04N 21/4394* (2013.01); *H04N 21/44008* (2013.01); *H04N 21/4756* (2013.01);

(Continued)

(58) Field of Classification Search
None
See application file for complete search history.

(56) References Cited

U.S. PATENT DOCUMENTS

| 5,900,908 A | 5/1999 | Kirkland |
| 6,209,028 B1 | 3/2001 | Walker et al. |

(Continued)

OTHER PUBLICATIONS

Branje, et al., LiveDescribe: Can Amateur Describers Create High-Quality Audio Description? AFB Journal of Visual Impairment & Blindness, Mar. 2012, vol. 106, No. 3.

(Continued)

*Primary Examiner* — Fernando Alcon
(74) *Attorney, Agent, or Firm* — Haley Guiliano LLP

(57) ABSTRACT

Methods and systems for automatically evaluating an audio description track of a media asset include initializing a rating of an audio description track of a media asset to a default value; receiving a first video frame and a second video frame of the media asset; detecting an object in the first video frame and the second video frame; determining that a difference in a characteristic of the object between the first video frame and the second video frame exceeds a threshold difference; determining that an audio characteristic in a portion of the audio description track that corresponds to the first video frame and the second video frame exceeds a threshold audio characteristic; and increasing the rating of the audio description track by a unit.

20 Claims, 12 Drawing Sheets

(51) Int. Cl.
*H04N 21/439* (2011.01)
*H04N 21/44* (2011.01)
*H04N 21/83* (2011.01)
*G06F 17/27* (2006.01)
*H04N 21/2343* (2011.01)
*H04N 21/435* (2011.01)
*H04N 21/475* (2011.01)
*H04N 21/81* (2011.01)
*H04N 21/84* (2011.01)

(52) U.S. Cl.
CPC ......... *H04N 21/8106* (2013.01); *H04N 21/83* (2013.01); *H04N 21/84* (2013.01)

(56) References Cited

U.S. PATENT DOCUMENTS

| | | | |
|---|---|---|---|
| 6,630,963 | B1 | 10/2003 | Billmaier |
| 7,966,184 | B2 | 6/2011 | O'Conor et al. |
| 8,229,748 | B2 | 7/2012 | Chang et al. |
| 8,643,779 | B2 | 2/2014 | Suess et al. |
| 8,645,846 | B2 | 2/2014 | Cragun |
| 8,819,565 | B2 | 8/2014 | Cragun |
| 8,842,811 | B2 | 9/2014 | Odinak |
| 8,949,902 | B1 | 2/2015 | Fabian-Isaacs |
| 9,620,124 | B2 | 4/2017 | Wlodkowski et al. |
| 2005/0183109 | A1 | 8/2005 | Basson |
| 2009/0083801 | A1 | 3/2009 | Hardacker et al. |
| 2009/0190899 | A1 | 7/2009 | Bangalore |
| 2010/0171886 | A1 | 7/2010 | Anderson et al. |
| 2010/0253689 | A1 | 10/2010 | Dinicola |
| 2013/0124984 | A1 | 5/2013 | Kuspa |
| 2015/0312646 | A1 | 10/2015 | Dhanabalan et al. |

OTHER PUBLICATIONS

ITC Guidance on Standards for Audio Description, http://msradio.huji.ac.il/narration.doc, date visited Mar. 13, 2017.

Jekat, et al., On the Perception of Audio Description: Developing a Model to Compare Films and Their Audio Described Versions, trans-kom, http://www.trans-kom.eu/bd08nr02/trans-kom_08_02_06_Jekat_ua_Audiodescription.20151211.pdf, date visited Mar. 13, 2017.

Peli, et al., Evaluating Visual Information Provided by Audio Description, AFB Journal of Visual Impairment & Blindness, Sep.-Oct. 1996, vol. 90, No. 5.

Salway, A Corpus-based Analysis of Audio Description, http://www.bbrel.co.uk/pdfs/Pre-edited%20version%20Audio%20Description%20a%20Corpus-based%20Analysis.pdf, date visited Mar. 13, 2017.

Video Description Research and Development Center, The Audio Description Project, http://www.acb.org/adp/vdrdc.html), date visited Mar. 13, 2017.

900

900 initialize matrix containing pixels of left edge and store as *left*
902 initialize matrix containing pixels of right edge and store as *right*
904 initialize matrix containing *left* and *right* and store as *shape*
906 for each element of *left*
908     store the element as *left_test*
910     store the horizontal component of *left_test* as *left_test_h*
912     store the vertical component of *left_test* as *left_test_v*
914     find element in *right* having vertical component matching *left_test_v* and store as *right_test*
916     *left_test_h* = *left_test_h* + 1
918     if the horizontal component of *right_test* is greater than *left_test_h*
920         add [*left_test_h left_test_v*] to *shape*
922         goto line 916
924     else
926         goto line 906
928     end
930
932 remove duplicates from *shape*

1101 Initialization subroutine
1105 Receive instances of difference in position
1106 For each difference in position
1107     A=difference in position
1108     B=threshold number of pixels
1109     If (A>B)
1112         Determine audio characteristic in portion
            of audio description track
1114 Termination subroutine

| | |
|---|---|
| 1301 | Initialization subroutine |
| 1305 | Receive instances of identifier |
| 1306 | For each identifier |
| 1307 |     Query database for entries matching identifier |
| 1308 |     If entries found that match identifier |
| 1309 |         Retrieve synonyms from entries |
| 1310 |         Determine number of times in which synonym or identifier occur in portion of audio description track |
| 1311 |     Else |
| 1312 |         Goto line 1313 |
| 1313 |     If entries found that are similar to identifier |
| 1314 |         Retrieve synonyms from entries |
| 1315 |         Determine number of times in which synonym or identifier occur in portion of audio description track |
| 1316 |     Else |
| 1317 |         Goto line 1318 |
| 1318 | Termination subroutine |

FIG. 13

METHODS AND SYSTEMS FOR AUTOMATICALLY EVALUATING AN AUDIO DESCRIPTION TRACK OF A MEDIA ASSET

CROSS-REFERENCE TO RELATED APPLICATIONS

This application is a continuation of U.S. patent application Ser. No. 15/223,847, now allowed, filed Jul. 29, 2016, which is incorporated by reference herein in its entirety.

BACKGROUND

Media assets often have ratings of quality gathered from multiple users that can assist other users in deciding whether to watch media assets. However, assisting visually impaired users in deciding whether to watch media assets can be difficult. Conventional ratings often focus on the entertainment value of media assets, but not on the accessibility of media assets for visually impaired users. Additionally, because visually impaired users represent a subset of a larger population of users, it may be difficult to collect meaningful ratings about accessibility of media assets for visually impaired users.

SUMMARY

Accordingly, systems and methods are described herein for a media guidance application that generates a rating based on the accessibility of the media assets for visually impaired users. Specifically, the media guidance application automatically evaluates an audio description track of a media asset, where the audio description track supplements the media asset's standard audio track with audio descriptions of visual events occurring in the media asset, for how comprehensively the audio description track describes visual events occurring in the media asset. Moreover, the media guidance application may represent this evaluation in the form of a numerical rating. This solution is achieved by detecting changes in characteristics of objects in media assets (e.g., a change in the position of a character) and analyzing whether an audio characteristic of the audio description track (e.g., a certain number of keywords relevant to the change) is present near the time when the change occurred. These systems and methods differ from conventional ratings in that they evaluate accessibility of media assets for visually impaired users, rather than evaluating entertainment value, and that they are automatically generated, rather than collected from a population of users.

In some aspects, methods and systems are described herein for automatically evaluating an audio description track of a media asset. The media asset may be, for example, a movie or a television show.

The methods and systems include control circuitry configured to generate for display, on a display screen, a listing for a media asset, wherein the media asset includes a plurality of sequentially ordered video frames and an audio track corresponding to the plurality of video frames. The listing for the media asset may be, for example, a program listing on a media guidance application providing information about time, channel, etc., for the media asset. The plurality of video frames may include, for example, visual information encoded as an array of pixels that contains visual content of the media asset. Each video frame of the media asset may correspond to a specific time in the run-time of the media asset. For example, one video frame may correspond to a time that is one minute into the run-time of the media asset and another video frame may correspond to a time that is one minute and one second into the run-time of the media asset. Accordingly, the video frame corresponding to one minute is ordered before the video frame corresponding to one minute and one second into the run-time of the media asset. The audio track may, for example, include audio content corresponding to the visual content that is included in a standard version of the media asset. The audio content of the audio track may correspond to specific times in the run-time of the media asset. For example, if a video frame at one minute into the run-time of the media asset shows an explosion, the audio track may include an explosive noise at one minute into the run-time of the media asset.

The control circuitry is further configured to receive, from a user, a request to evaluate an audio description track of the media asset, wherein the audio description track comprises audio content that supplements the audio track with audio descriptions of visual events occurring in the media asset. For example, the request may be received by way of a user input interface, such as a remote control, mouse, trackball, keypad, keyboard, touch screen, touchpad, stylus input, joystick, or voice recognition interface. For example, the request may include selection, by a user, of a program listing for the media asset using a highlighted region of a media guidance application. The audio description track may, for example, include audio information indicating that a visual event in the media asset has occurred at or near the time in the run-time of the media asset when the visual event has occurred. For example, if the visual event in the media asset is an explosion, the audio track of the media asset may simultaneously include an explosive sound, and the audio description track may simultaneously, or beforehand, or afterward, include an audible indication that an explosion has occurred. For example, the audio description track may include a voice that says, "An explosion occurs."

The control circuitry is further configured to initialize a rating of the audio description track to a default value, where the rating of the audio description track indicates a numerical evaluation of how comprehensively the audio description track describes visual events occurring in the media asset. The default value may be a numerical value, such as zero, ten, or one hundred, or may be provided in other units, such as a certain number of stars, thumbs-up, etc. The default value may be a letter, such as A or B. Alternatively, the rating may be initialized to a default verbal indication of quality, such as "average," "poor," "excellent," etc.

The control circuitry is further configured to receive a first video frame and a second video frame of the plurality of sequentially ordered video frames. The first video frame and the second video frame may be received, for example, from a media content source, or may be stored on storage. The first video frame is ordered before the second video frame in the plurality of sequentially ordered video frames. The first video frame corresponds to a first time and the second video frame corresponds to a second time. For example, the first video frame may occur one minute and one second into the run-time of the media asset and the second video frame may occur one minute and three seconds into the run-time of the media asset.

The control circuitry is further configured to detect an object in the first video frame. For example, the object may be anything discrete, such as an inanimate object, a portion of an inanimate object, a character, a portion of a character (e.g., a face), etc. To detect the object, control circuitry may use edge detection (e.g., Canny edge detection, Deriche edge detection, differential edge detection, and/or methods involving the Sobel, Prewitt, and Roberts cross operators), pattern recognition, including, but not limited to, self-learning systems (e.g., neural networks), and/or any other suitable technique or method.

The control circuitry is further configured to detect, in the second video frame, the object that the control circuitry detected in the first video frame. To detect the object, control circuitry may use edge detection (Canny edge detection, Deriche edge detection, differential edge detection, and/or methods involving the Sobel, Prewitt, and Roberts cross operators), pattern recognition, including, but not limited to, self-learning systems (e.g., neural networks), and/or any other suitable technique or method.

The control circuitry is further configured to determine a difference in a characteristic of the object between the first video frame and the second video frame. To detect the difference in the characteristic of the object, control circuitry may use edge detection (Canny edge detection, Deriche edge detection, differential edge detection, and/or methods involving the Sobel, Prewitt, and Roberts cross operators), pattern recognition, including, but not limited to, self-learning systems (e.g., neural networks), and/or any other suitable technique or method. To detect the difference in the characteristic of the object, control circuitry may determine the characteristic of the object in the first video frame and the characteristic of the object in the second video frame and then determine the difference. For example, the characteristic may be position, size, color, or, if the object is a character, an emotion.

The control circuitry is further configured to compare the difference to a threshold difference. For example, if the characteristic of the object is position or size, the threshold difference may be a certain number of pixels. For example, if the characteristic of the object is color, the threshold difference may be a certain RGB value (or CMYK value, or value of any other color model). For example, if the characteristic of the object is emotion, the threshold difference may be any change in emotion, or a certain degree of change of emotion.

The control circuitry is further configured, based on the difference exceeding the threshold difference, to determine an audio characteristic in a portion of the audio description track that corresponds to a range of time that includes the first time and the second time. For example, the range of time may be equal to the range of time from the first time to the second time, or the range of time may extend a certain amount of time before the first time, or the range of time may extend a certain amount of time after the second time, or the range of time may extend a first amount of time before the first time and a second amount of time after the second time. For example, the range of time may be the same as the range of time in which a scene containing the first video frame and the second video frame occurs. For example, the audio characteristic may be volume, or a number of keywords, or relatedness to an emotion.

The control circuitry is further configured to compare the audio characteristic to a threshold audio characteristic. For example, if the audio characteristic is volume, the threshold audio characteristic may be a certain level of volume (e.g., measured in decibels). For example, if the audio characteristic is number of keywords, the threshold audio characteristic may be a certain number. For example, if the audio characteristic is relatedness to an emotion, the threshold audio characteristic may be a certain degree of relatedness to an emotion.

The control circuitry is further configured, based on the audio characteristic exceeding the threshold audio characteristic, to increase the rating of the audio description track by a unit. For example, the unit may be a numerical value, such as one, or any other value. For example, the unit may be a number in other units, such as a certain number of stars, thumbs-up, etc. For example, control circuitry may increase the rating from one letter of the alphabet to another, such as from B to A. For example, the control circuitry may increase the rating of the audio description track to a higher verbal indication of quality. For example, control circuitry may increase the rating of the audio description track from "average" to "good."

The control circuitry is further configured to generate for display an indication of the rating. For example, the indication may be an icon or a word generated for display in proximity of a program listing or a program information region for the media asset. For example, the indication may be an increased size of a program listing or a program information region for the media asset. For example, the indication may be a change in color of a program listing or a program information region for the media asset.

In some embodiments, the control circuitry is configured, when detecting the object in the first video frame, to detect a first object and a second object in the first video frame. For example, the control circuitry may detect a car and a bird. The control circuitry is further configured to determine a first subset of a plurality of pixels of a display screen in which the first object occurs in the first video frame. For example, the control circuitry may determine that the car occurs in a subset containing 1000 pixels. The control circuitry is further configured to determine a second subset of the plurality of pixels in which the second object occurs in the first video frame. For example, the control circuitry may determine that the bird occurs in a subset containing 100 pixels. The control circuitry is further configured to determine that a number of pixels in the first subset is greater than a number of pixels in the second subset. For example, control circuitry may determine that the 1000 pixels in the first subset is greater than the 100 pixels in the second subset. The control circuitry is further configured to select the first object to be the object. For example, the control circuitry may select the car to be the object.

In certain embodiments, the control circuitry is configured, when detecting the object in the first video frame, to detect a first object and a second object in the first video frame. For example, the control circuitry may detect a car and a bird. The control circuitry is further configured to receive metadata associated with the first video frame. For example, the control circuitry may receive metadata that contains a description of a scene in which the first video frame occurs, such as "The car explodes." The control circuitry is further configured to detect an identifier of the first object in the metadata. For example, the control circuitry may detect the word "car" in "The car explodes." The control circuitry is further configured to select the first object to the object. For example, the control circuitry may select the car to be the object.

In some embodiments, the first object is a character, and the control circuitry is configured, when detecting the identifier of the first object in the metadata, to detect at least one of a name of the character and an actor who plays the character. For example, the first object may be the character Jason Bourne, and the metadata may contain at least one of a name of the character (e.g., "Jason Bourne") and an actor who plays the character (e.g., "Matt Damon").

In certain embodiments, the characteristic of the object is a position of the object. For example, each pixel of a display screen displaying the media asset may be assigned an address. For example, each pixel may have an address, including a horizontal address and a vertical address. For example, the position of the object may be considered to be the address of the pixel among the object's pixels that is farthest to the right, farthest to the left, farthest to the top, or farthest to the bottom. For example, the position of the object may be considered to be the address of the object's pixel that is centermost. For example, the position of the object may be considered to be the mean (or median, or mode) of all the horizontal addresses of the object's pixels and the mean (or median, or mode) of all the vertical address of the object's pixels.

In some embodiments, the control circuitry is configured, when determining the difference in the first characteristic of the object between the first video frame and the second video frame, to assign an address to each pixel of a plurality of pixels of the display screen, wherein each address comprises a horizontal address corresponding to a horizontal position on the display screen of each pixel and a vertical address corresponding to a vertical position on the display screen of each pixel. For example, each pixel may have an address, including a horizontal address and a vertical address. For example, the horizontal address of pixels in the column at the far left of the display screen (or any other starting column of pixels) may be assigned to be zero (or any other default value), and the horizontal address of pixels in each successive column to the left (or right) may be assigned to be one (or any other unit) higher (or lower) than the address of the previous column. For example, the vertical address of pixels in the row at the bottom of the display screen (or any other starting row of pixels) may be assigned to be zero (or any other default value), and the vertical address of pixels in each successive row above (or below) may be assigned to be one (or any other unit) higher (or lower) than the address of the previous column.

The control circuitry is further configured to determine a first subset of the plurality of pixels in which the object occurs in the first video frame. For example, the control circuitry may determine that the object occurs in pixels with addresses (4,1), (4,2), and (5,1) in the first video frame, where the first value in the pair is the horizontal address of the pixel and the second value in the pair is the vertical address of the pixel. The control circuitry is further configured to determine a second subset of the plurality of pixels in which the object occurs in the second video frame. For example, the control circuitry may determine that the object occurs in pixels with addresses (7,2), (7,3), and (8,2) in the second video frame. The control circuitry is further configured to calculate a first horizontal mean, wherein the first horizontal mean corresponds to a mean of the horizontal address of the first subset. For example, the first horizontal mean may be 13/3. The control circuitry is further configured to calculate a first vertical mean, wherein the first vertical mean corresponds to a mean of the vertical address of the first subset. For example, the first vertical mean may be 4/3. The control circuitry is further configured to calculate a second horizontal mean, wherein the second horizontal mean corresponds to a mean of the horizontal addresses of the second subset. For example, the second horizontal mean may be 22/3. The control circuitry is further configured to calculate a second vertical mean, wherein the second vertical mean corresponds to a mean of the vertical addresses of the second subset. For example, the second vertical mean may be 7/3. The control circuitry is further configured to subtract the second horizontal mean from the first horizontal mean to obtain a horizontal difference. For example, the horizontal difference may be −9/3. The control circuitry is further configured to subtract the second vertical mean from the first vertical mean to obtain a vertical difference. For example, the vertical difference may be −1.

The control circuitry is further configured, when comparing the difference to a threshold difference, to compare an absolute value of the horizontal difference to a threshold number of pixels and to compare an absolute value of the vertical difference to a threshold number of pixels. For example, the threshold number of pixels may be 2, the horizontal difference may be −9/3, and the vertical difference may be −1. The control circuitry may compare 9/3 to 2 and 1 to 2. The control circuitry is further configured to determine the difference to exceed the threshold difference if the absolute value of the horizontal difference or the absolute value of the vertical difference exceeds the threshold number of pixels. For example, control circuitry may determine the difference to exceed the threshold difference because 9/3 exceeds 2.

In certain embodiments, the control circuitry is further configured, based on the audio characteristic not exceeding the threshold audio characteristic, to generate audio content corresponding to at least one of the object and the characteristic of the object in the portion of the audio description track.

In some embodiments, the control circuitry is configured, when determining the audio characteristic in the portion of the audio description track, to determine a volume of audio content in the portion of the audio description track. For example, the control circuitry may determine that the volume of a voice speaking the audio description in the audio description track reaches a certain number of decibels in a portion of the audio description track.

In certain embodiments, the control circuitry is configured, when determining the audio characteristic in the portion of the audio description track, to identify the object with an identifier. For example, if the object is a door, the control circuitry may identify the object with "door." The control circuitry is further configured to access a database of synonyms. For example, the control circuitry may access an electronic thesaurus. The control circuitry is further configured to retrieve from the database a plurality of keywords for the identifier, wherein the keywords are synonyms for the identifier. For example, the control circuitry may retrieve the keywords "doorway," "opening," and "entrance." The control circuitry is further configured to determine a number of times in which a keyword of the plurality of keywords or the identifier occurs in the portion of the audio description track. For example, if the audio description track contains "The boy walks through the door and pauses and then is followed by a girl running through the entrance," the control circuitry may determine that a keyword has occurred twice in the audio description track.

In some embodiments, the control circuitry is further configured, when generating for display the indication of the rating, to generate for display at least one of a word, icon, size of the listing, color of the listing, and presence of the listing corresponding to the rating.

It should be noted that the systems and/or methods described may be applied to, or used in accordance with, other systems, methods, and/or apparatuses.

BRIEF DESCRIPTION OF THE DRAWINGS

The above and other objects and advantages of the disclosure will be apparent upon consideration of the following detailed description taken in conjunction with the accompanying drawings, in which like reference characters refer to like parts throughout, and in which:

FIG. 9 shows example pseudocode for a process for determining a subset of pixels of a plurality of pixels in which an object occurs in accordance with some embodiments of the disclosure;

FIGS. 10 and 11 present processes for control circuitry to compare two values in accordance with some embodiments of the disclosure;

FIGS. 12 and 13 present processes implemented on control circuitry to search a database and retrieve items from a database in accordance with some embodiments of the disclosure.

DETAILED DESCRIPTION OF THE DRAWINGS

Figure 1:
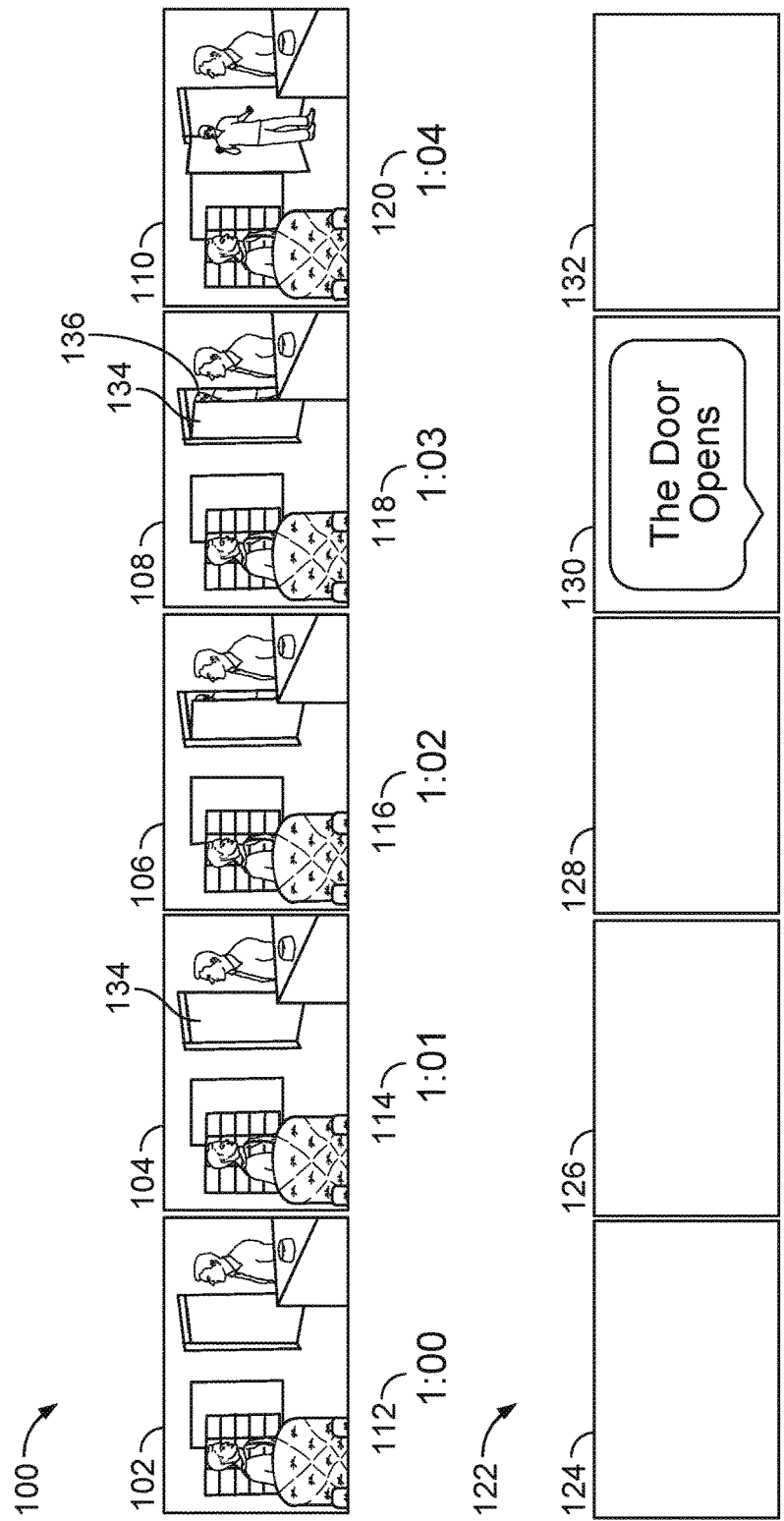
FIG. 1 shows an illustrative example of a general principle for evaluating an audio description track as disclosed herein in accordance with some embodiments of the disclosure.

Systems and methods are described herein for automatically evaluating an audio description track of a media asset, where the audio description track supplements the media asset's standard audio track with audio descriptions of visual events occurring in the media asset. The rating of the audio description track indicates a numerical evaluation of how comprehensively the audio description track describes visual events occurring in the media asset. This solution is achieved by detecting changes in characteristics of objects in media assets (e.g., a change in the position of a character) and analyzing whether an audio characteristic of the audio description track (e.g., a certain number of keywords relevant to the change) is present near the time when the change occurred.

As referred to herein, the term "media asset" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content.

As referred to herein, the term "video frame" should be understood to mean any visual information encoded as an array of pixels that contains visual content of a media asset. For example, a video frame may be one frame of a movie or a television show.

As referred to herein, the term "audio track" should be understood to mean any audio content corresponding to visual content that is included in a standard version of a media asset. The audio content of the audio track may correspond to specific times in the run-time of the media asset. For example, if a frame at one minute into the run-time of the media asset shows an explosion, the audio track may include an explosive noise at one minute into the run-time of the media asset.

As referred to herein, the term "audio description track" should be understood to mean any audio content that supplements the audio track with audio descriptions of visual events occurring in the media asset. The audio description track may, for example, include audio information indicating that a visual event in the media asset has occurred at or near the time in the run-time of the media asset when the visual event has occurred. For example, if the visual event in the media asset is an explosion, the standard audio track of the media asset may simultaneously include an explosive sound, and the audio description track may simultaneously, or beforehand, or afterward, include an audible indication that an explosion has occurred. For example, the audio description track may include a voice that says, "An explosion occurs."

As referred to herein, the term "rating" in reference to an audio description track should be understood to mean any numerical evaluation of how comprehensively the audio description track describes visual events occurring in a media asset.

As referred to herein, the term "object" should be understood to mean anything discrete in a video frame. For example, the object may be an inanimate object, a portion of an inanimate object, a character, a portion of a character (e.g., a face), etc.

As referred to herein, the term "character" should be understood to mean any animate object, such as a person, an animal, a personified object, etc.

As referred to herein, the term "characteristic" when used in reference to an object should be understood to mean any property of an object, such as the object's position, size, color, emotion, etc.

As referred to herein, the term "audio characteristic" should be understood to mean any property of audio content, such as volume, number of keywords used in the audio content, relatedness of the audio content to an emotion, etc.

As referred to herein, the terms "identifier" and "keywords" should be understood to mean any words or groups of words that can identify an object. For example, identifiers or keywords for a door may be "door," "entrance," "doorway," etc.

As referred to herein, the term "metadata" should be understood to mean any supplemental content of a media asset that describes the media asset or is used in conjunction with the media asset. For example, metadata may be a summary of a scene of the media asset.

The amount of content available to users in any given content delivery system can be substantial. Consequently, many users desire a form of media guidance through an interface that allows users to efficiently navigate content selections and easily identify content that they may desire.

An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

In some embodiments, control circuitry 404, discussed further in relation to FIG. 4 below, executes instructions stored in memory (i.e., storage 408 discussed further in relation to FIG. 4 below). Specifically, control circuitry 404 may be instructed to perform the functions discussed above and below. For example, the instructions may cause control circuitry 404 to generate the displays as described above and below. In some implementations, any action performed by control circuitry 404 may be based on instructions.

FIG. 1 shows an illustrative example of a general principle for evaluating audio description track as disclosed herein in accordance with some embodiments of the disclosure. Media asset 100 includes a plurality of video frames 102, 104, 106, 108, and 110 in a sequential order. For example, first video frame 104 occurs before second video frame 108 in the sequential order. Each of the video frames 102, 104, 106, 108, and 110 corresponds to a time 112, 114, 116, 118, and 120. For example, first video frame 104 corresponds to first time 114 and second video frame 108 corresponds to second time 118. Audio description track 122 comprises audio content 124, 126, 128, 130, and 132. In FIG. 1, audio content 124, 126, 128, and 132 just include silence, while audio content 130 includes audible audio description. Audio content 124, 126, 128, 130, and 132 supplement standard audio content of the media asset with audio descriptions of visual events occurring in the media asset 100. Each of the audio content 124, 126, 128, 130, and 132 corresponds to a time 112, 114, 116, 118, and 120. For example, audio content 130 corresponds to second time 118. In evaluating an audio description track, a rating may be generated. The rating may indicate a numerical evaluation of how comprehensively the audio description track describes visual events occurring in the media asset.

In FIG. 1, object 134 (a door) is present in first video frame 104 and second video frame 108. There is a significant change in the position of object 134 between first video frame 104 and second video frame 108 (i.e., because the door is closed in first video frame 104 and open in second video frame 108). If the audio description track 122 is comprehensive, there should be audio content at a time corresponding to this significant change in the position of object 134. In FIG. 1, there is audio content 130 at second time 118 (corresponding to second video frame 108). Accordingly, based on this instance, an evaluation of the rating of the audio description track 122 would increase the rating.

As another example, character 136 is present in second video frame 108 but not present in first video frame 104. If the audio description track 122 is comprehensive, there should be audio content at a time corresponding to this significant change, i.e., the appearance of character 136. For example, if in FIG. 1, audio content 130 said, "A man enters the room," an evaluation of the rating of the audio description track 122 may increase the rating.

Figure 2:
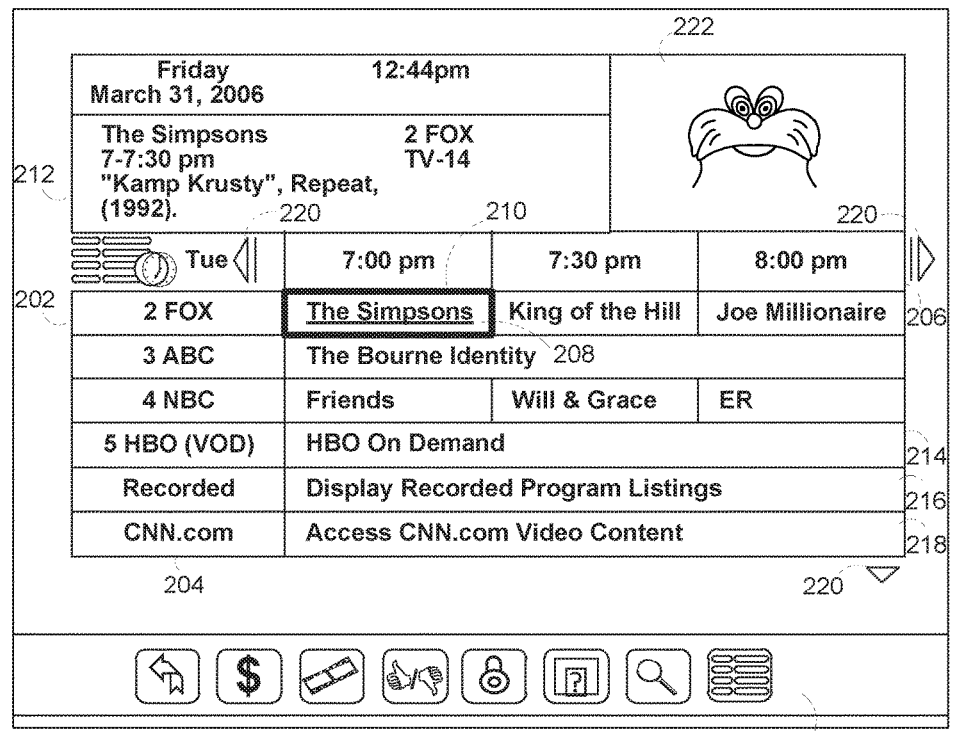
FIG. 2 shows an illustrative media listing display in accordance with some embodiments of the disclosure.
Figure 3:
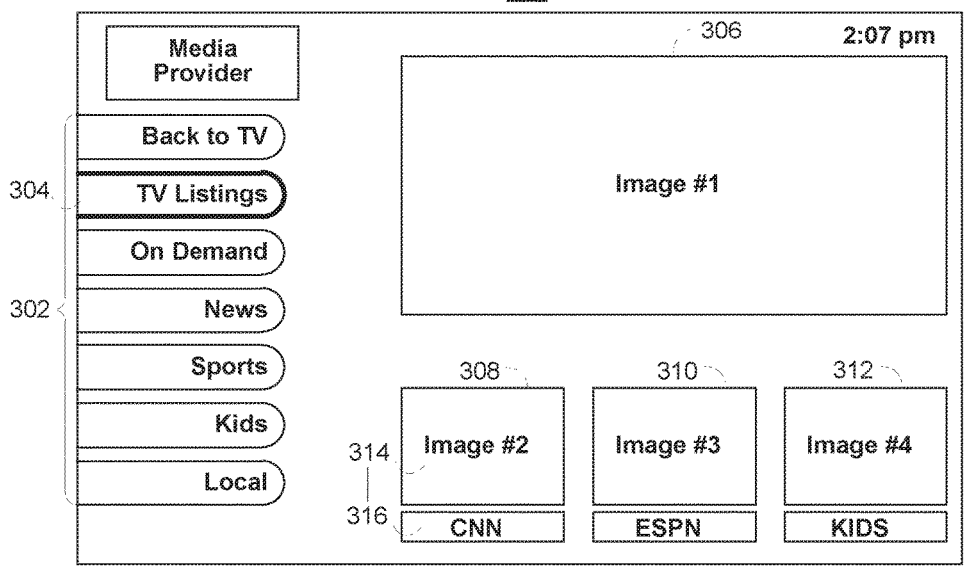
FIG. 3 shows another illustrative media listing display in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
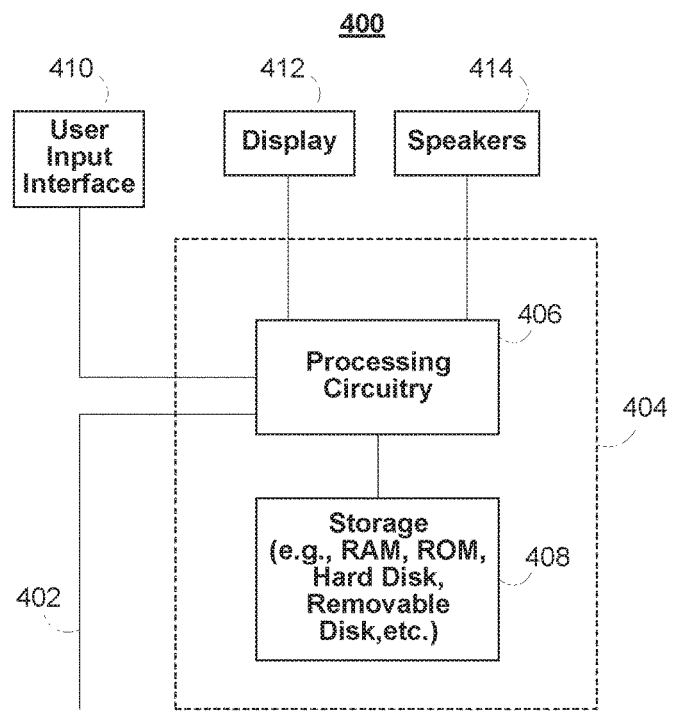
FIG. 4 is a block diagram of an illustrative user equipment device in accordance with some embodiments of the disclosure.
Figure 5:
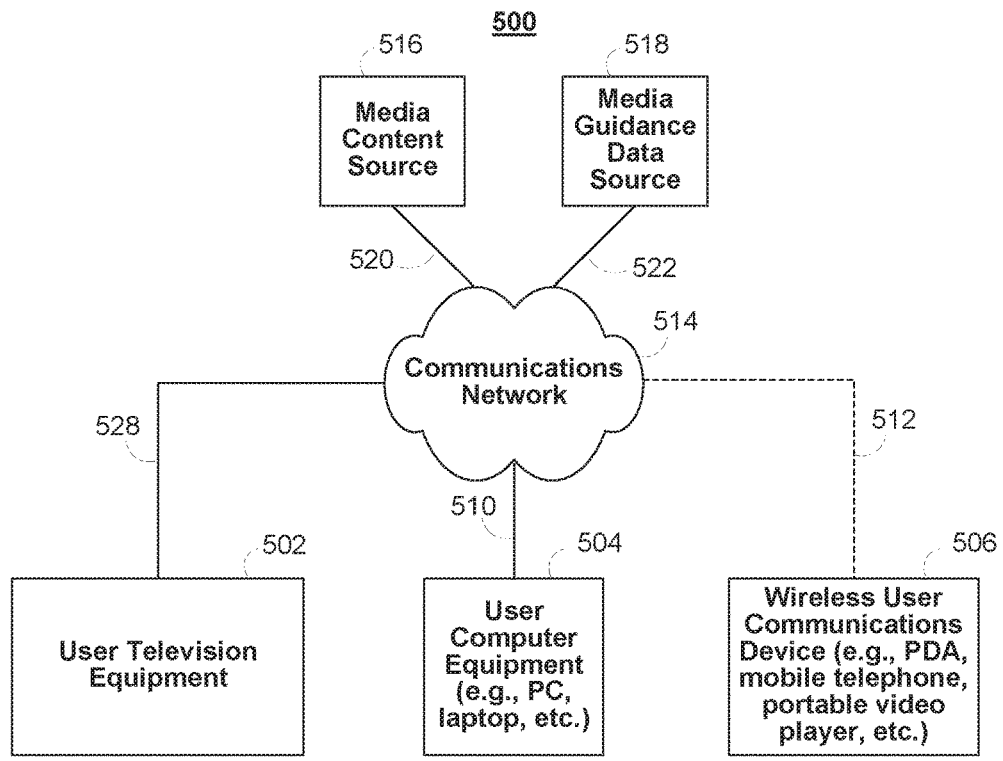
FIG. 5 is a block diagram of an illustrative media system in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512.

Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a standalone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
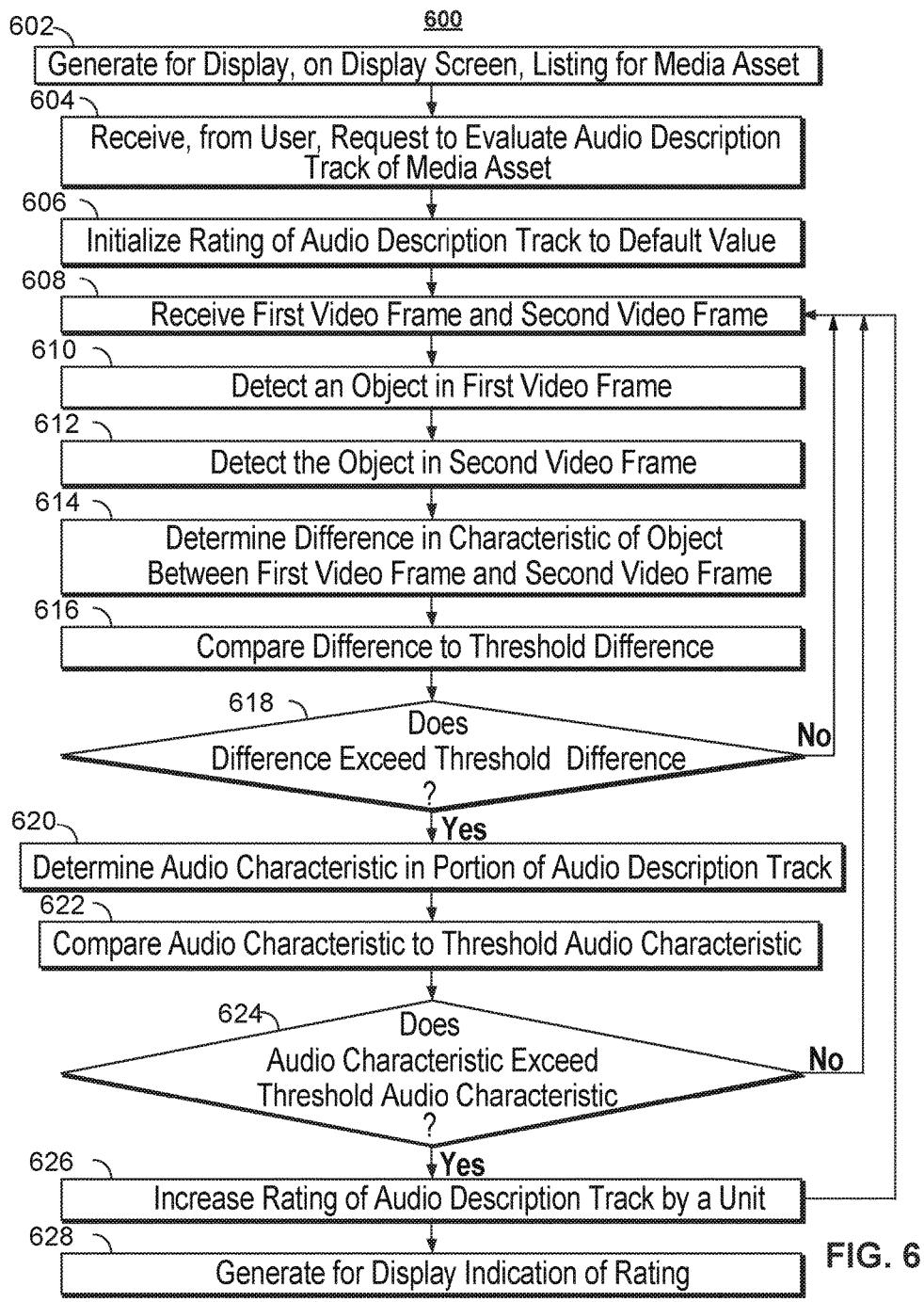
FIG. 6 is a flow chart of a process implemented on control circuitry for automatically evaluating an audio description track of a media asset in accordance with some embodiments of the disclosure.

The flow chart in FIG. 6 describes a process 600 implemented on control circuitry 404 for automatically evaluating an audio description track of a media asset in accordance with some embodiments of the disclosure. A single iteration through process 600 serves to evaluate audio description for a single portion of the media asset that is analyzed by control circuitry 404 during process 600. To evaluate audio description for the entire media asset, or multiple portions thereof, control circuitry 404 may repeat steps of process 600 multiple times to analyze multiple portions of the media asset.

Process 600 begins at step 602. At step 602, control circuitry 404 generates for display, on a display screen, a listing for a media asset. For example, the listing may be program listing 208. The media asset includes a plurality of sequentially ordered video frames and an audio track corresponding to the plurality of video frames. The plurality of video frames may include, for example, visual information encoded as an array of pixels that contains visual content of the media asset. Each video frame of the video may correspond to a specific time in the run-time of the media asset. For example, one video frame may correspond to a time that is one minute into the run-time of the media asset, and another video frame may correspond to a time that is one minute and one second into the run-time of the media asset. Accordingly, the video frame corresponding to one minute is ordered before the video frame corresponding to one minute and one second into the run-time of the media asset. The audio track may, for example, include audio content corresponding to the visual content. The audio content of the audio track may correspond to specific times in the run-time of the media asset. For example, if a video frame at one minute into the run-time of the media asset shows an explosion, the audio track may include an explosive noise at one minute into the run-time of the media asset. Control circuitry 404 then proceeds to step 604.

To initiate the evaluation, at step 604, control circuitry 404 receives a request from a user to evaluate an audio description of a media asset. The audio description track comprises audio content that supplements the audio track with audio descriptions of visual events occurring in the media asset. The audio description track may, for example, include audio information indicating that a visual event in the media asset has occurred at or near the time in the run-time of the media asset when the visual event has occurred. For example, if the visual event in the media asset is an explosion, the standard audio track of the media asset may simultaneously include an explosive sound, and the audio description track may simultaneously, or beforehand, or afterward, include an audible indication that an explosion has occurred. For example, the audio description track may include a voice that says, "An explosion occurs." The request from the user may be received with user input interface 410, which may be a remote control, mouse, trackball, keypad, keyboard, touch screen, touchpad, stylus input, joystick, voice recognition interface, etc. The request may include selection, by a user, of program listing 208 for the media asset using highlighted region 210. Control circuitry 404 then proceeds to step 606.

In some implementations, instead of or in addition to receiving the request from the user to evaluate the audio description track, the audio description track is evaluated at or by a content source (e.g., content source 516) before transmission of the media asset to a user equipment device (e.g., user equipment device 400). In such implementations, the process may begin at step 606, and it should be understood that while the following description discusses control circuitry 404, certain steps may be performed by different control circuitries. For example, in implementations where the evaluation is performed at or by a content source, steps 608-626 may be performed by control circuitry of the content source, and generating for display the listing of the media asset and the indication of the rating may be performed by control circuitry of the user equipment device.

At step 606, control circuitry 404 initializes a rating of the audio description track to a default value. The default value may be a numerical value, such as zero, ten, or one hundred, or may be provided in other units, such as a certain number of stars, thumbs-up, etc. Alternatively, the rating may be initialized to a default verbal indication of quality, such as "average," "poor," "excellent," etc. Alternatively, the rating may be initialized to a letter, such as A or B. Control circuitry 404 then proceeds to step 608.

At step 608, control circuitry 404 receives a first video frame (e.g., first video frame 104) of the plurality of video frames. The first video frame may be received, for example, from content source 516, or may be stored on storage 408. The first video frame corresponds to a first time (e.g., first time 114) in the run-time of the media asset. For example, the first video frame may occur one minute and one second into the run-time of the media asset.

The first video frame may be received by control circuitry 404 according to any selection method. In some implementations, if control circuitry 404 is repeating process 600, for the first iteration through process 600, control circuitry 404 may receive, as the first video frame, the first video frame in the sequential order of video frames, and for the second iteration through process 600, control circuitry 404 may receive, as the first video frame, the second video frame in the sequential order of video frames. In certain implementations, for the first iteration through process 600, control circuitry 404 may receive, as the first video frame, a frame among the first video frames of the first scene in the media asset, and for the second iteration through process 600, control circuitry 404 may receive, as the first video frame, a frame among the first video frames of the second scene of the media asset. The media asset may include scene information in its media guidance information or metadata, or control circuitry 404 may process the media asset to determine scene transitions using techniques such as artificial intelligence, machine vision, etc. In some implementations, the first video frame used for the second iteration through process 600 may be a frame that is a certain number of frames after the first video frame used for the first iteration through process 600. In certain implementations, the first video frame used for the second iteration through process 600 may be a frame that is a certain amount of time in the run-time of the media asset after the first video frame used for the first iteration through process 600. In some implementations, the first video frame is randomly chosen, or chosen using a random process subject to certain conditions. The above descriptions of first iteration and second iteration are not meant to be limiting but are merely meant to represent any iteration and its successive iteration.

At step 608, control circuitry 404 also receives a second video frame (e.g., second video frame 108) of the plurality of video frames. The second video frame may be received, for example, from content source 516, or may be stored on storage 408. The second video frame corresponds to a second time (e.g., second time 118) in the run-time of the media asset. For example, the second video frame may occur one minute and three seconds into the run-time of the media asset. The first video frame is ordered before the second video frame in the plurality of sequentially ordered video frames.

The second video frame may be received by control circuitry 404 according to any selection method. In some implementations, the second video frame is the frame immediately after the first video frame. In certain implementations, the second video frame is a frame that is a certain number of frames after the first video frame. In some implementations, the second video frame is chosen based on the second time being a certain amount of time after the first time. In certain implementations, the second video frame is a frame that is among the last frames in a scene containing the first video frame. In some implementations, the second video frame is randomly chosen, or chosen using a random process subject to certain conditions. Control circuitry 404 then proceeds to step 610.

At step 610, control circuitry 404 detects an object in the first video frame. For example, the object may be anything discrete, such as an inanimate object, a portion of an inanimate object, a character, a portion of a character (e.g., a face), etc. To detect the object, control circuitry 404 may use edge detection (e.g., Canny edge detection, Deriche edge detection, differential edge detection, and/or methods involving the Sobel, Prewitt, and Roberts cross operators), pattern recognition, including, but not limited to, self-learning systems (e.g., neural networks), and/or any other suitable technique or method. In some implementations, control circuitry 404 may detect multiple objects in the first video frame and may proceed through portions of the remainder of process 600 using one selected object of the multiple detected objects. For example, to select the one object, control circuitry 404 may select the largest object in size among the multiple detected objects. For example, if control circuitry 404 detects two objects, such as a car and a bird, control circuitry 404 may determine a first subset of a plurality of pixels of a display screen in which the first object occurs in the first video frame and a second subset of the plurality of pixels in which the second object occurs in the first video frame. For example, the first subset corresponding to the car may contain 1000 pixels and the second subset corresponding to the bird may contain 100 pixels. Control circuitry 404 may determine that a number of pixels in the first subset (e.g., 1000) is greater than a number of pixels in the second subset (e.g., 100) and select the first object (e.g., the car). As other examples, control circuitry 404 may select the brightest object among the multiple detected objects, the object with the most significant color contrast among the multiple detected objects, etc. As another example, the control circuitry 404 may select a character instead of an inanimate object. As another example, the control circuitry 404 may receive metadata associated with the first video frame, and the metadata may contain an identifier of an important object in the first video frame. Control circuitry 404 may choose that important object instead of another object. For example, control circuitry 404 may detect a car and a bird. The metadata may contain a description of a scene in which the first video frame occurs, such as "The car explodes." Control circuitry 404 may select the car based on the identifier ("car") in the metadata. As another example, one of the detected objects may be a character (e.g., Jason Bourne), and the metadata may contain at least one of a name of the character (e.g., "Jason Bourne") and an actor who plays the character (e.g., "Matt Damon"). Control circuitry 404 may detect the identifier of the character in the metadata and select the character instead of other detected objects. In certain implementations, control circuitry 404 may detect multiple objects in the first video frame and may proceed through portions of the remainder of process 600 multiple times for each of the multiple detected objects or a subset of the multiple detected objects.

In some implementations, control circuitry 404 may identify the object with an identifier. For example, control circuitry 404 may identify what kind of object the object is (e.g., identify that object 134 is a door) and associate the object with an identifier representing the kind of object (e.g., "door"). To identify what kind of object the object is, control circuitry 404 may use edge detection (e.g., Canny edge detection, Deriche edge detection, differential edge detection, and/or methods involving the Sobel, Prewitt, and Roberts cross operators), pattern recognition, including, but not limited to, self-learning systems (e.g., neural networks), and/or any other suitable technique or method. As another example, if the object is a character, control circuitry 404 may identify which character it is. To do this, control circuitry 404 may use facial recognition, searching through an image database, self-learning systems (e.g., neural networks), and/or any other suitable technique or method. In some implementations, metadata associated with the first video frame may contain information about characters appearing in the first video frame, and control circuitry 404 may use this information to identify a character in the first video frame. Control circuitry 404 then proceeds to step 612.

At step 612, control circuitry 404 detects, in the second video frame, the object (e.g., object 134) that control circuitry 404 detected in 610. To detect the object, control circuitry 404 may use edge detection (Canny edge detection, Deriche edge detection, differential edge detection, and/or methods involving the Sobel, Prewitt, and Roberts cross operators), pattern recognition, including, but not limited to, self-learning systems (e.g., neural networks), and/or any other suitable technique or method. Control circuitry 404 then proceeds to step 614.

At step 614, control circuitry 404 detects a difference in a characteristic of the object between the first video frame and the second video frame. To detect the difference in the characteristic of the object, control circuitry 404 may use edge detection (Canny edge detection, Deriche edge detection, differential edge detection, and/or methods involving the Sobel, Prewitt, and Roberts cross operators), pattern recognition, including, but not limited to, self-learning systems (e.g., neural networks), and/or any other suitable technique or method. To detect the difference in the characteristic of the object, control circuitry 404 may determine the characteristic of the object in the first video frame and the characteristic of the object in the second video frame and then determine the difference.

For example, the characteristic of the object may be position. For example, as shown in FIG. 1, the position of object 134 is different between first video frame 104 and second video frame 108. The position of an object may be determined based on any suitable method. For example, each pixel of a display screen displaying the media asset may be assigned an address. For example, each pixel may have an address, including a horizontal address and a vertical address. The horizontal address of pixels in the column at the far left of the display screen (or any other starting column of pixels) may be assigned to be zero (or any other default value), and the horizontal address of pixels in each successive column to the left (or right) may be assigned to be one (or any other unit) higher (or lower) than the address of the previous column. The vertical address of pixels in the row at the bottom of the display screen (or any other starting row of pixels) may be assigned to be zero (or any other default value), and the vertical address of pixels in each successive row above (or below) may be assigned to be one (or any other unit) higher (or lower) than the address of the previous row. In some implementations, other methods for addressing pixels are used. The addresses of all the object's pixels, meaning the pixels comprising the object on the display screen, may be determined. For further discussion, see FIGS. 8-9. The position of the object may be considered to be the address of the pixel among the object's pixels that is farthest to the right, farthest to the left, farthest to the top, or farthest to the bottom. In certain implementations, if multiple pixels are equally far to the right (or equally far to the left, top, or bottom), one of these pixels may be chosen at random. In some implementations, if multiple pixels are equally far to the right (or equally far to the left, top, or bottom), the pixel that is farthest towards another extreme is chosen. For example, if there are multiple pixels that are equally far to the right, the pixel of these pixels that is farthest to the top may be chosen. In some implementations, the position of the object may be considered to be the address of the object's pixel that is centermost. In certain implementations, the horizontal position of the object is considered to be the mean (or median, or mode) of all the horizontal addresses of the object's pixels and the vertical position of the object is considered to be the mean (or median, or mode) of all the vertical address of the object's pixels. For example, control circuitry 404 may determine that the object occurs in pixels with addresses (4,1), (4,2), and (5,1) in the first video frame, and that the object occurs in pixels with addresses (7,2), (7,3), and (8,2) in the second video frame, where the first value in the pair is the horizontal address of the pixel and the second value in the pair is the vertical address of the pixel. The first horizontal mean (i.e., the horizontal position of the object in the first video frame) would be calculated to be the mean of 4, 4, and 5, or 13/3. The first vertical mean (i.e., the vertical position of the object in the first video frame) would be calculated to be the mean of 1, 2, and 1, or 4/3. The second horizontal mean (i.e., the horizontal position of the object in the second video frame) would be calculated to be the mean of 7, 7, and 8, or 22/3. The second vertical mean (i.e., the vertical position of the object in the second video frame) would be calculated to be the mean of 2, 3, and 2, or 7/3.

To determine the difference in the position of the object between the first video frame and the second video frame, the difference between the horizontal mean (or median, or mode) of the object in the first video frame and the horizontal mean (or median, or mode) of the object in the second video frame may be determined, and the difference between the vertical mean (or median, or mode) of the object in the first video frame and the vertical mean (or median, or mode) of the object in the second video frame may be determined. For example, if the first horizontal mean is 13/3, the first vertical mean is 4/3, the second horizontal mean is 22/3, and the second vertical mean is 7/3, the horizontal difference may be calculated as 13/3−22/3=−9/3 and the vertical difference may be calculated as 4/3−7/3=−1. In some implementations, to determine the difference in the position of the object between the first video frame and the second video frame, the position of the object in the second video frame is subtracted from the position of the object in the first video frame. In certain implementations, to determine the difference in the position of the object between the first video frame and the second video frame, the position of the object in the first video frame is subtracted from the position of the object in the second video frame. In some implementations, to determine the difference in the position of the object between the first video frame and the second video frame, the absolute value of the difference between the position of the object in the first video frame and the position of the object in the second video frame is determined.

As another example, the characteristic of the object may be size. The size of the object may be determined according to any suitable method. For example, as discussed above, the pixels comprising the object on the display screen may be determined. For further discussion, see FIGS. 8-9. Control circuitry 404 may count the number of the object's pixels and consider that number to be the size of the object.

As another example, the characteristic of the object may be color. The color of an object may be determined according to any suitable method. For example, each pixel of a display screen displaying the media asset may be assigned a color. The color of each pixel may be the color of each pixel according to the RGB (red, green, blue) color model, the CMYK (cyan, magenta, yellow, black) color model, or any other color model. As discussed above, the pixels comprising the object on the display screen may be determined, and if the RGB color model is used, the color of the object may be considered to be the mean (or maximum, minimum, median, or mode) of the red component of each of the object's pixels, the mean (or maximum, minimum, median, or mode) of the green component of each of the object's pixels, and the mean (or maximum, minimum, median, or mode) of the blue component of each of the object's pixels. If the CMYK color model is used, a similar method as discussed above for the RGB model can be used.

As another example, the object may be a character, and the characteristic may be the character's emotion. To determine a character's emotion, the face of the character may be detected using edge detection (e.g., Canny edge detection, Deriche edge detection, differential edge detection, and/or methods involving the Sobel, Prewitt, and Roberts cross operators), pattern recognition, including, but not limited to, self-learning systems (e.g., neural networks), and/or any other suitable method. The expression on the face of the character may be compared to a database of facial expressions representing emotions. For example, the database may include three images of facial expressions, one facial expression associated with the emotion happy, one facial expression associated with the emotion content, and one facial expression associated with the emotion sad. Control circuitry 404 may detect a first facial expression of the character in the first video frame and a second facial expression of the character in the second video frame. Control circuitry 404 may determine the emotion of the facial expression in the database that is closest to the facial expression of the character in each frame and associate the emotion associated with the closest facial expression in the database to be the emotion of the character in each frame. For example, control circuitry 404 may determine the emotion of the character in the first video frame to be happy and the emotion of the character in the second video frame to be sad. If the emotion of the character in the first video frame is determined to be different from the emotion of the character in the second video frame, then the difference in the emotion of the character between the first video frame and the second video frame may be considered to be changed. If the emotion of the character in the first video frame is the same as the emotion of the character in the second video frame, then the difference in the emotion of the character between the first video frame and the second video frame may be considered to be unchanged. For example, a change from happy to sad may be determined to be "changed." In some implementations, there may be varying degrees of difference in emotion. For example, a change from happy to content may be considered to be "small" while a change from happy to sad may be considered to be "large." In some implementations, the difference in emotion may be quantified as a numerical value. Control circuitry 404 then proceeds to step 616.

At step 616, the difference in the characteristic of the object between the first video frame and the second video frame is compared to a threshold difference. For example, if the characteristic of the object is position, the threshold difference may be a certain number of pixels. For example, as discussed above, the difference in the position of the object between the first video frame and the second video may be calculated by determining a first horizontal mean, a second horizontal mean, a first vertical mean, and a second vertical mean, subtracting the second (or first) horizontal mean from the first (or second) horizontal mean to obtain a horizontal difference, and subtracting the second (or first) vertical mean from the first (or second) vertical mean to obtain a vertical difference. Following such an example, to compare the difference in the characteristic to the threshold difference, the absolute value of the horizontal difference and the absolute value of the vertical difference may be compared to the threshold number of pixels. If either the absolute value of the horizontal difference or the absolute value of the vertical difference, or both, exceeds the threshold number of pixels, then the difference in the characteristic is determined to exceed the threshold difference. For example, if the threshold number of pixels is 2, the horizontal difference is −9/3, and the vertical difference is −1, control circuitry 404 may take the absolute value of −9/3 to obtain 9/3 and take the absolute value of −1 to obtain 1. Control circuitry 404 may compare 9/3 to 2 and 1 to 2, determine that 9/3 exceeds 2, and determine that the difference exceeds the threshold difference.

For example, if the characteristic of the object is size, the threshold difference may be a certain number of pixels. For example, if the characteristic of the object is color, the threshold difference may be a certain RGB value (or CMYK value, or value of any other color model). For example, if the characteristic of the object is emotion, the threshold difference may be any change in emotion. For example, if emotion changes from one emotion to another, that difference in emotion is considered to exceed the threshold difference. As another example, the threshold difference may be a certain degree in the change of emotion. For example, the threshold difference may be a "large" difference in emotion, as discussed above.

In comparing the difference in the characteristic of the object to a threshold difference, the control circuitry 404 may determine whether the difference in the characteristic of the object is significant. The threshold difference may be modified to change what is considered significant. For example, if the threshold difference is set to be low, more differences may be detected in the media asset, and the audio description track may be evaluated for a higher level of comprehensiveness. If, on the other hand, the threshold difference is set to be high, fewer differences may be detected in the media asset, and the audio description track may be evaluated for a lower level of comprehensiveness. Control circuitry 404 then proceeds to step 618.

At step 618, control circuitry 404 determines whether the difference in the characteristic of the object exceeds the threshold difference. If the difference does not exceed the threshold difference, control circuitry 404 proceeds to step 608. Alternatively, control circuitry may proceed to step 628. If the difference does exceed the threshold difference, control circuitry 404 proceeds to step 620.

At step 620, control circuitry 404 determines an audio characteristic in a portion of the audio description that corresponds to a range of time that includes the first time and the second time. As discussed above, the first video frame corresponds to the first time in the run-time of the media asset, and the second video frame corresponds to the second time in the run-time of the media asset. In some implementations, the range of time is equal to the range of time from the first time to the second time. In certain implementations, the range of time extends a certain amount of time before the first time. In some implementations, the range of time extends a certain amount of time after the second time. In certain implementations, the range of time extends a first amount of time before the first time and a second amount of time after the second time. The first amount of time and the second amount of time may be the same or different. In some implementations, the range of time depends on audio content in the audio description track. In some implementations, the range of time may be the same as the range of time in which the scene containing the first video frame and the second video frame occurs.

For example, the audio characteristic may be volume. For example, control circuitry 404 may determine that the volume of a voice speaking the audio description in the audio description track reaches a certain number of decibels in a certain portion of the audio description track. In some implementations, control circuitry 404 determines an average (or maximum, minimum, median, mode) volume of the audio description track during the range of time. In certain implementations, control circuitry 404 determines multiple average (or maximum, minimum, median, mode) volumes during multiple portions of the range of time. For example, control circuitry 404 may divide the range of time into one-second portions and determine the average (or maximum, minimum, median, mode) volume of the audio description track during each of the one-second portions.

For example, the audio characteristic may be number of keywords. In some implementations, control circuitry 404 analyzes the audio description track during the range of time for keywords. In certain implementations, control circuitry 404 counts how many times a certain keyword or keywords occur in the audio description track. To analyze the audio description track for keywords, control circuitry 404 may use audio analysis and speech recognition techniques, including, but not limited to, Hidden Markov Models, dynamic time warping, and/or neural networks to process audio data and/or translate spoken words into text. The keyword(s) chosen may be based on the object. For example, if control circuitry 404 identified the object with an identifier, the keyword may be the identifier. For example, if the object is a door, the keyword may be "door." If the object is a character, the keyword may be the character's name. In some implementations, control circuitry 404 accesses a database of synonyms and retrieves from the database of synonyms a list of multiple identifiers of the object, and the multiple identifiers of the object are the keywords. For example, if the object is a door, the keywords may be "doorway," "opening," "entrance," in addition to the identifier "door." The keyword may also be related to the characteristic. If the characteristic is position, then the keyword may be "position," or multiple synonyms may be generated for the characteristic using the method discussed above. In some implementations, control circuitry 404 may analyze the audio description track for keywords related both to the object and the characteristic.

For example, the audio characteristic may be relatedness to an emotion. In some implementations, control circuitry 404 accesses a database of sound recordings, each sound recording in the database associated with an emotion. Control circuitry 404 compares the audio description track during the range of time, or one or more portions of the audio description track during the range of time, to the sound recordings in the database. The emotion of the sound recording that most closely matches the portion of the audio description track is determined to be the emotion of the portion of the audio description track. Control circuitry 404 may then compare how related the emotion of the portion of the audio description track is to another emotion. For example, if the characteristic of the object determined in step 614 is emotion, control circuitry 404 may determine how related the emotion of the portion of the audio description track is to an emotion of the object determined in step 614. For example, if an emotion of the object determined in step 614 is sad, and the emotion of the portion of the audio description track is happy, then control circuitry 404 may determine the audio characteristic of the audio description track to be "unrelated." For example, if an emotion of the object determined in step 614 is sad, and the emotion of the portion of the audio description track is sad, then control circuitry 404 may determine the audio characteristic of the audio description to be "related." For example, if an emotion of the object determined in step 614 is happy, and the emotion of the portion of the audio description track is content, then control circuitry 404 may determine the audio characteristic of the audio description to be "highly related."

In some implementations, relatedness to an emotion is quantified as a numerical value. Control circuitry 404 then proceeds to step 622.

At step 622, control circuitry 404 compares the audio characteristic to a threshold audio characteristic. For example, if the audio characteristic is volume, the threshold audio characteristic may be a certain level of volume (e.g., measured in decibels). Accordingly, based on determining the significant change in the characteristic of the object in step 618, in step 624, control circuitry 404 determines whether there is audio content in the audio description track that is equal to or greater to a certain level of volume. For example, if the audio description track is silent, this may indicate that the description track does not contain description of the change in the characteristic of the object. As another example, if the audio description track is not silent, this may indicate that the audio description track contains description of the change in the characteristic of the object.

For example, if the audio characteristic is number of keywords, the threshold audio characteristic may be a certain number. For example, if in step 618, control circuitry 404 determines a significant change in the characteristic of the object, in step 622, control circuitry 404 may analyze the audio description track to determine how many times keywords related to an identifier of the object and/or the characteristic (as discussed above in relation to step 620), or the identifier itself, occur in the audio description. For example, if the identifier is "door," synonyms are "doorway," "opening," and "entrance," and the audio description track contains "The boy walks through the door and pauses and then is followed by a girl running through the entrance," the control circuitry 404 may determine that a keyword or the identifier has occurred twice in the audio description track. For example, if the audio description track contains a number of instances of the keyword(s) that is less than the threshold number, this may indicate that the description track does not contain a description of the change in the characteristic of the object. As another example, if the audio description track contains a number of instances of the keyword(s) that is greater than the threshold number, this may indicate that the description track does contain a description of the change in the characteristic of the object.

For example, if the audio characteristic is relatedness to an emotion, the threshold audio characteristic may be a certain degree of relatedness to an emotion. For example, the degree of relatedness may be "highly related." As another example, if relatedness to an emotion is quantified, the threshold audio characteristic may be a value. For example, if in step 618, control circuitry 404 determines a significant change in the emotion of a character, in step 622, control circuitry 404 may analyze the audio description track to determine how related the emotion of the audio description track is to an emotion of the character during the significant change in emotion. For example, if the emotion of the audio description track is unrelated or has low relation to an emotion of the character during the significant change in emotion, this may indicate that the description track does not contain a description of the change in the emotion of the character. As another example, if the emotion of the audio description track is related or has high relation to an emotion of the character during the significant change in emotion, this may indicate that the description track does contain a description of the change in the emotion of the character. Control circuitry 404 then proceeds to step 624.

At step 624, control circuitry 404 determines whether the audio characteristic exceeds the threshold audio characteristic. If control circuitry 404 determines that the audio characteristic does exceed the threshold audio characteristic, control circuitry 404 proceeds to step 626.

If control circuitry 404 determines at step 624 that the audio characteristic does not exceed the threshold audio characteristic, control circuitry 404 proceeds to step 608. Alternatively, control circuitry may proceed to step 628. In some implementations, if control circuitry 404 determines at step 624 that the audio characteristic does not exceed the threshold audio characteristic, control circuitry 404 generates audio content corresponding to at least one of the object and the characteristic of the object in the portion of the audio description track. For example, if the object is a car and the characteristic of the object is a change in position, for example, a movement to the right, the audio content may be "The car moves to the right." Accordingly, control circuitry 404 may supplement the audio description track with audio content corresponding to at least one of the object and the characteristic of the object if control circuitry 404 determines that the audio description track may not have such audio content. In certain implementations, control circuitry 404 may generate the audio content at step 618, based on determining that the difference in the characteristic of the object exceeds the threshold difference. For further discussion of generating audio content in the audio description track, see the discussion of FIG. 14.

At step 626, control circuitry 404 increases the rating of the audio description track by a unit. In some implementations, the unit may be a numerical value, such as one, or any other value. In certain implementations, the unit is a number in other units, such as a certain number of stars, thumbs-up, etc. In some implementations, control circuitry 404 may increase the rating of the audio description track to a higher verbal indication of quality. For example, control circuitry 404 may increase the rating of the audio description track from "average" to "good." In certain implementations, if the rating is a letter, control circuitry 404 may increase the letter, for example, from A to B.

In certain implementations, instead of or in addition to control circuitry 404 increasing the rating of the audio description track by a unit based on the audio characteristic exceeding the threshold audio description, control circuitry 404 decreases the rating of the audio description track by a unit based on the audio characteristic not exceeding the threshold audio description. Control circuitry 404 may then proceed to step 608 to analyze more video frames in the media asset. As control circuitry 404 proceeds through steps 608-626, the rating of the audio descriptions will reflect each analyzed portion of the media asset. Accordingly, it is possible with multiple iterations through process 600 to arrive at a rating that reflects the entire media asset, or a significant portion of the media asset. Control circuitry 404 can also proceed from step 626 to step 628.

At step 628, control circuitry 404 generates for display an indication of the rating. In some implementations, the indication is an icon or a word generated for display in proximity of a program listing (e.g., program listing 208) or a program information region (e.g., program information region 212) for the media asset. In such implementations, the icon or word may be the rating itself. For example, if the rating is 100, the word may be "100." If the rating is five thumbs up, the icon may be an image of five thumbs up. For example, if the rating is below a certain level, the icon or word may be an "x" or "not recommended" while if the rating is above a certain level, the icon or word may be a check mark or "recommended." In certain implementations, the indication is an increased size of a program listing (e.g., program listing 208) or a program information region (e.g., program information region 212) for the media asset. In such implementations, the size of the program listing or program information region may be proportional to the rating. For example, a program listing corresponding to a media asset having a rating of 100 may be twice as large as a program listing corresponding to a media asset having a rating of 50. In some implementations, the indication is a change in color of a program listing (e.g., program listing 208) or a program information region (e.g., program information region 212) for the media asset. In certain implementations, certain colors may be associated with certain rating levels while other colors may be associated with other rating levels. For example, a green program listing may indicate that the corresponding media asset has a rating above 50, while a red program listing may indicate that the corresponding media asset has a rating below 50. In some implementations, the color may be proportional to the rating. For example, white may correspond to a rating between 0-25, light green may correspond to a rating between 25-50, medium green may correspond to a rating between 50-75, and dark green may correspond to a rating between 75-100. In some implementations, the indication of the rating is presence or absence of a program listing for the media asset. For example, program listings for media assets having ratings below a certain level may be removed from a grid of a program listings display (e.g., display 200). In some implementations, if a channel generally shows media assets with ratings below a certain level (e.g., the average rating for media assets shown on the channel is below a certain level) then the entire channel will not appear in a grid of a program listings display (e.g., display 200). In certain implementations, instead of or in addition to generating for display the indication of the rating, as a user changes channels using a channel up/down option, channels showing media assets with ratings below a certain level may be skipped. In certain implementations, instead of or in addition to generating for display the indication of the rating, control circuitry 404 generates an audible indication of the rating. For example, the indication may be a spoken indication of the rating, such as "This program has a rating of 100." As another example, the indication may be one sound for an indication that the rating is above a certain threshold and another sound for an indication that the rating is below the threshold.

As discussed above, in some implementations, instead of or in addition to receiving the request for the user to evaluate the audio description track, the audio description track is evaluated at or by a content source (e.g., content source) 516 before transmission of the media asset to a user equipment device (e.g., user equipment device 400). In such implementations, the rating may be transmitted along with the media asset (e.g., as metadata) to the user equipment device. In such implementations, upon generating for display the listing for the media asset, control circuitry 404 may retrieve the rating and generate for display the indication of the rating as well. In this way, a user may be able to see the rating of the audio description track for the media asset without needing to first request that the rating be generated.

Figure 7:
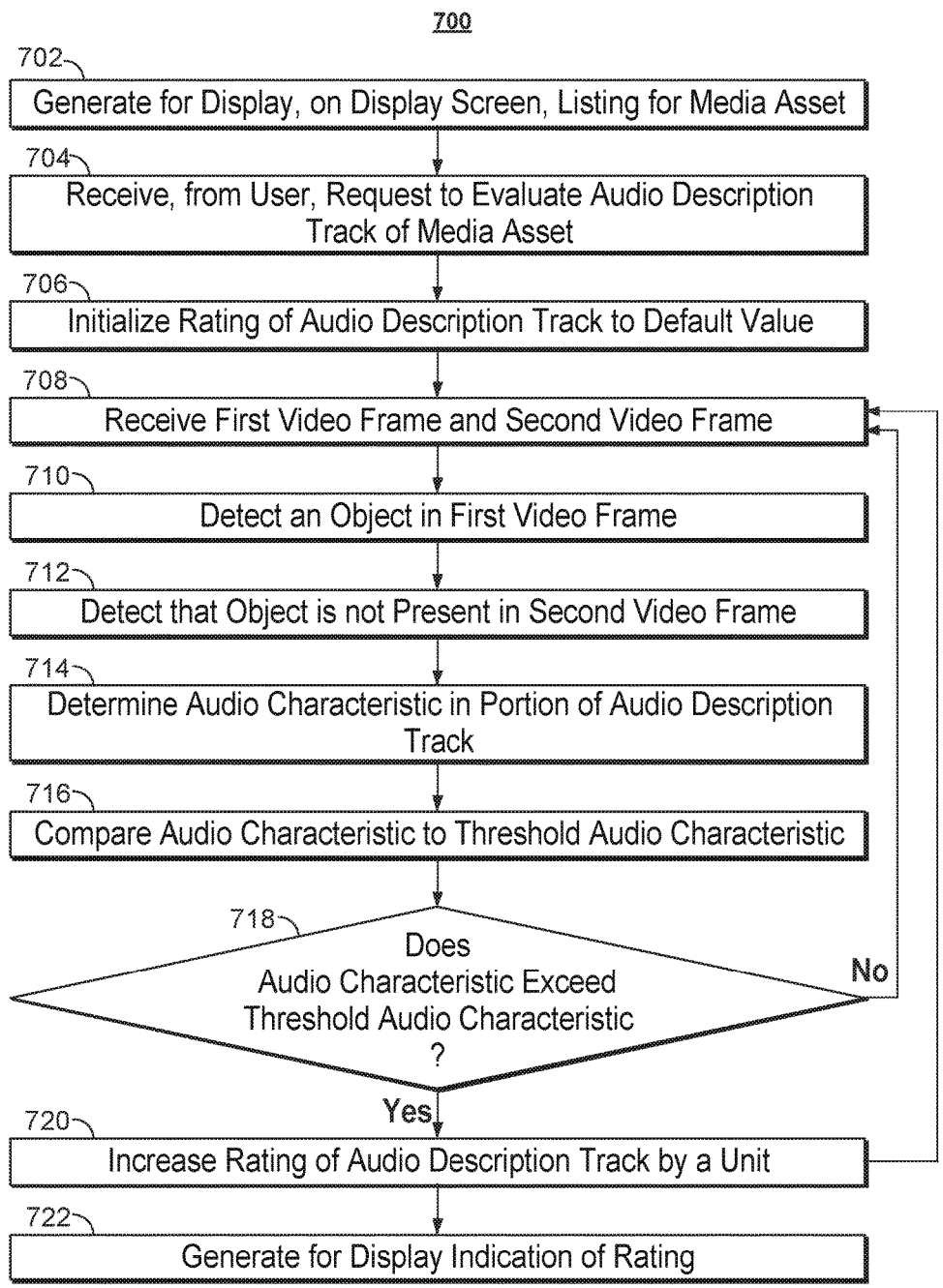
FIG. 7 is a flow chart of another process implemented on control circuitry for automatically evaluating an audio description track of a media asset in accordance with some embodiments of the disclosure.

The flow chart in FIG. 7 describes another process 700 implemented on control circuitry 404 for automatically evaluating an audio description track of a media asset in accordance with some embodiments of the disclosure. Any of the description, examples, or variants discussed in reference to process 600 may apply to process 700.

Process 700 begins at step 702. At step 702, control circuitry 404 generates for display, on a display screen, a listing for a media asset. Control circuitry 404 then proceeds to step 704.

To initiate the evaluation, at step 704, control circuitry 404 receives a request from a user to evaluate an audio description of a media asset. Control circuitry 404 then proceeds to step 706.

At step 706, control circuitry 404 initializes a rating of the audio description track to a default value. Control circuitry 404 then proceeds to step 708.

At step 708, control circuitry 404 receives a first video frame (e.g., first video frame 104) of the plurality of video frames. At step 708, control circuitry 404 also receives a second video frame (e.g., second video frame 108) of the plurality of video frames. The first video frame is ordered before the second video frame in the plurality of sequentially ordered video frames. The first video frame corresponds to a first time and the second video frame corresponds to a second time. Control circuitry 404 then proceeds to step 710.

At step 710, control circuitry 404 detects an object in the first video frame. Control circuitry 404 then proceeds to step 712.

At step 712, control circuitry 404 detects that the object that control circuitry 404 detected in the first video frame in step 710 is not present in the second video frame. For example, if control circuitry 404 detected a character in the first video frame in step 710, and in the media asset between the first video frame and the second video frame, the character walks out of the picture, then control circuitry 404 may not detect the character in the second video frame. For example, to detect that the object is not present in the second video frame, control circuitry 404 may segment the second video frame into multiple objects and determine that none of the multiple objects detected match the object detected in the first video frame. For example, control circuitry 404 may follow a movement path of the object starting from the first video and determine that the object has moved off screen by the second video frame. For example, control circuitry 404 may determine a plurality of possible configurations for the object, search the second video frame for each of the configurations, and determine that none of the configurations are present. For example, if the object is a dog, control circuitry 404 may determine a plurality of possible configurations for the dog, including the dog walking, running, jumping, sleeping, etc., and determine that none of the configurations are present in the second video frame. Control circuitry 404 then proceeds to step 714.

In some implementations, instead of detecting the object in the first video frame at step 710 and detecting that the object is not present in the second video frame at step 712, control circuitry 404 detects the object in the second video frame at step 710 and detects that the object is not present in the first video frame at step 712. For example, in FIG. 1, character 136 is present in second video frame 108 but not present in first video frame 104.

In detecting that the object is present in the first video frame but not present in the second video frame (or vice versa), control circuitry 404 may detect that a significant event has occurred (i.e., that the object has appeared or disappeared). If the audio description track is comprehensive, the audio description track should have audio content at a time corresponding to this significant event.

At step 714, control circuitry 404 determines an audio characteristic in a portion of the audio description track that corresponds to a range of time that includes the first time and the second time. Control circuitry 404 then proceeds to step 716.

At step 716, control circuitry 404 compares the audio characteristic to a threshold audio characteristic. Control circuitry 404 then proceeds to step 718.

At step 718, control circuitry 404 determines whether the audio characteristic exceeds the threshold audio characteristic. If control circuitry 404 determines that the audio characteristic does not exceed the threshold audio characteristic, control circuitry 404 proceeds to step 708. Alternatively, control circuitry may proceed to step 722. In some implementations, if control circuitry 404 determines that the audio characteristic does not exceed the threshold audio characteristic, control circuitry 404 generates audio content corresponding to at least one of the object and the characteristic of the object in the portion of the audio description track. If control circuitry 404 determines that the audio characteristic does exceed the threshold audio characteristic, control circuitry 404 proceeds to step 720.

At step 720, control circuitry 404 increases the rating of the audio description track by a unit. Control circuitry 404 may then proceed to step 708 to analyze more video frames in the media asset. As control circuitry 404 proceeds through steps 708-720, the rating of the audio descriptions will reflect each analyzed portion of the media asset. Accordingly, it is possible with multiple iterations through process 700 to arrive at a rating that reflects the entire media asset, or a significant portion of the media asset. Control circuitry 404 can also proceed from step 720 to step 722.

At step 722, control circuitry 404 generates for display an indication of the rating.

Figure 8:
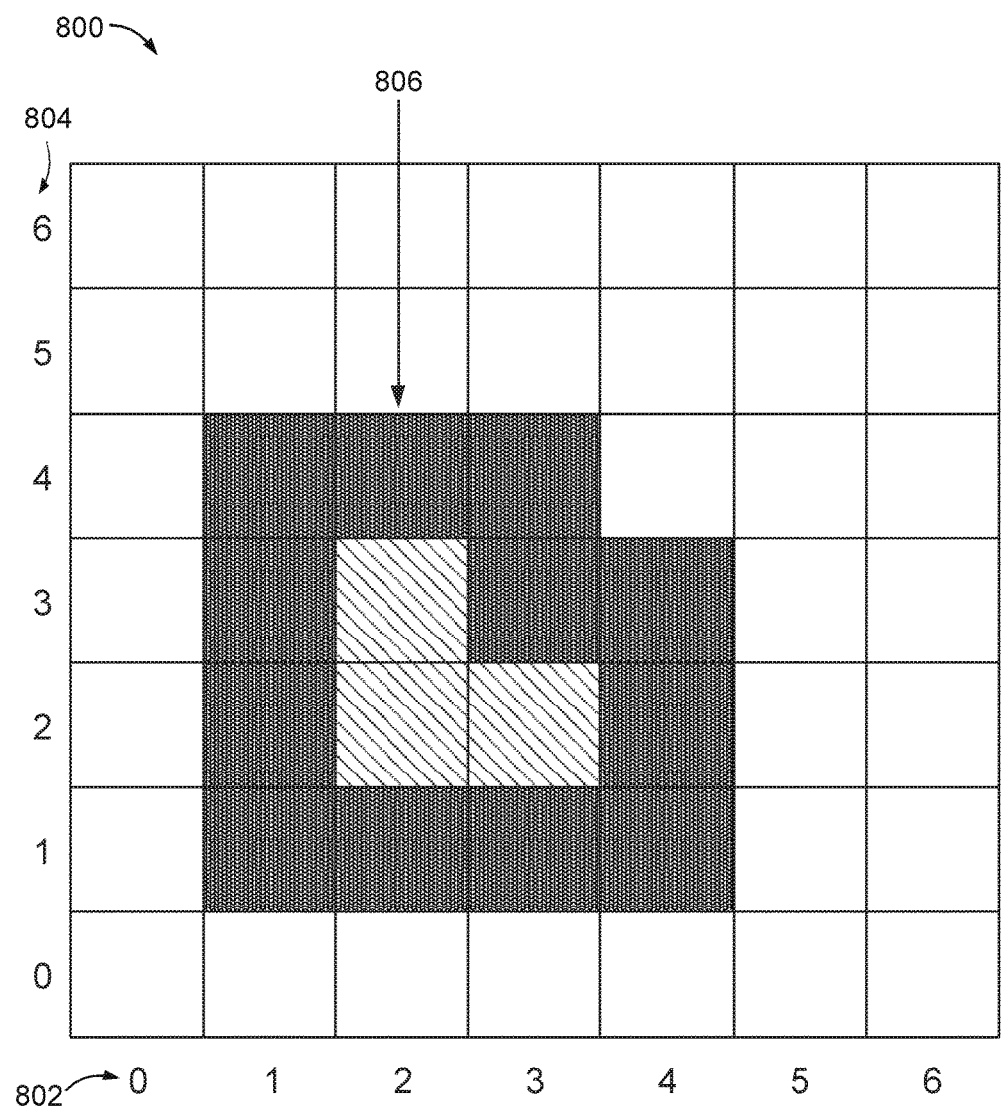
FIG. 8 shows an illustrative example of determining a subset of a plurality of pixels of a display screen in which an object occurs in a video frame in accordance with some embodiments of the disclosure.

FIG. 8 shows an illustrative example of determining a subset of a plurality of pixels of a display screen in which an object occurs in a first video frame. FIG. 8 shows a display screen comprising a plurality of pixels 800. Each pixel is assigned an address, including a horizontal address based on horizontal index 802 and vertical index 804. For example, the pixel at the bottom right corner of the plurality of pixels 800 has address (6,0), where the first number of the pair represents the horizontal address and the second number of the pair represents the vertical address. Plurality of pixels 800 includes object 806. Using edge detection, pattern recognition, including, but not limited to, self-learning systems (e.g., neural networks), and/or any other suitable technique or method, the left edge of object 806 is determined to include pixels at addresses (1,1), (1,2), (1,3), and (1,4), the bottom edge is determined to include pixels at addresses (1,1), (2,1), (3,1), and (4,1), the right edge is determined to include pixels at addresses (4,1), (4,2), (4,3), (3,3), and (3,4), and the top edge is determined to include pixels at addresses (1,4), (2,4), (3,4), (3,3), and (4,3). Object 806 also includes pixels in the interior of the edges, i.e., pixels at addresses (2,2), (2,3), and (3,2). Accordingly, the subset of pixels of the plurality of pixels 800 in which object 806 occurs is (1,1), (1,2), (1,3), (1,4), (2,1), (2,2), (2,3), (2,4), (3,1), (3,2), (3,3), (3,4), (4,1), (4,2), and (4,3).

FIG. 9 shows example pseudocode for a process for determining a subset of pixels of a plurality of pixels in which an object occurs. At line 900, a matrix is initialized containing the addresses of pixels of the left edge of the object and stored as the variable left. Following the example of FIG. 8, left would contain (1,1), (1,2), (1,3), and (1,4). At line 902, a matrix is initialized containing the addresses of pixels of the right edge of the object and stored as the variable right. Following the example of FIG. 8, right would contain (4,1), (4,2), (4,3), (3,3), and (3,4). At line 904, a matrix is initialized containing left and right and stored as shape. Following the example of FIG. 8, shape would contain (1,1), (1,2), (1,3), (1,4), (4,1), (4,2), (4,3), (3,3), and (3,4). Lines 906-908 loop through each element of left and stores the element as left_test. For example, the element (1,2) may be chosen. At lines 910-912, the horizontal and vertical components of left_test are stored as left_test_h and left_test_v, respectively. Following the above example, left_test_h would equal 1 and left_test_v would equal 2. At line 914, an element in right having a vertical component matching left_test_v is found and stored as right_test. Line 914 may be implemented as a loop through right. Following the above example, (4,2) may be chosen and stored as right_test. At line 916, left_test_h is incremented by one. Following the above example, left_test_h would be incremented to 2. At lines 918-922, if the horizontal component of right_test is greater than left_test_h, then a pixel with address (left_test_h, left_test_v) is added to shape, and the process returns to line 916. Following the above example, the horizontal component of right_test is 4 and left_test_h is 2, so (2,2) is added to shape and the process returns to line 916. On a subsequent run through lines 16-22, (3,2) would be added to shape. On a subsequent run, the conditional statement in line 18 would not be true, as left_test_h would be equal to the horizontal component of right_test, 4, so the process would proceed to line 906, where another element of left, such as (1,3), is chosen. Once each element of left has been chosen at line 906, the process proceeds to line 932, where duplicates are removed from shape. This process, when repeated similarly for the top and bottom edges, would result in shape containing the subset of pixels of the plurality of pixels in which the object occurs.

Figure 10:
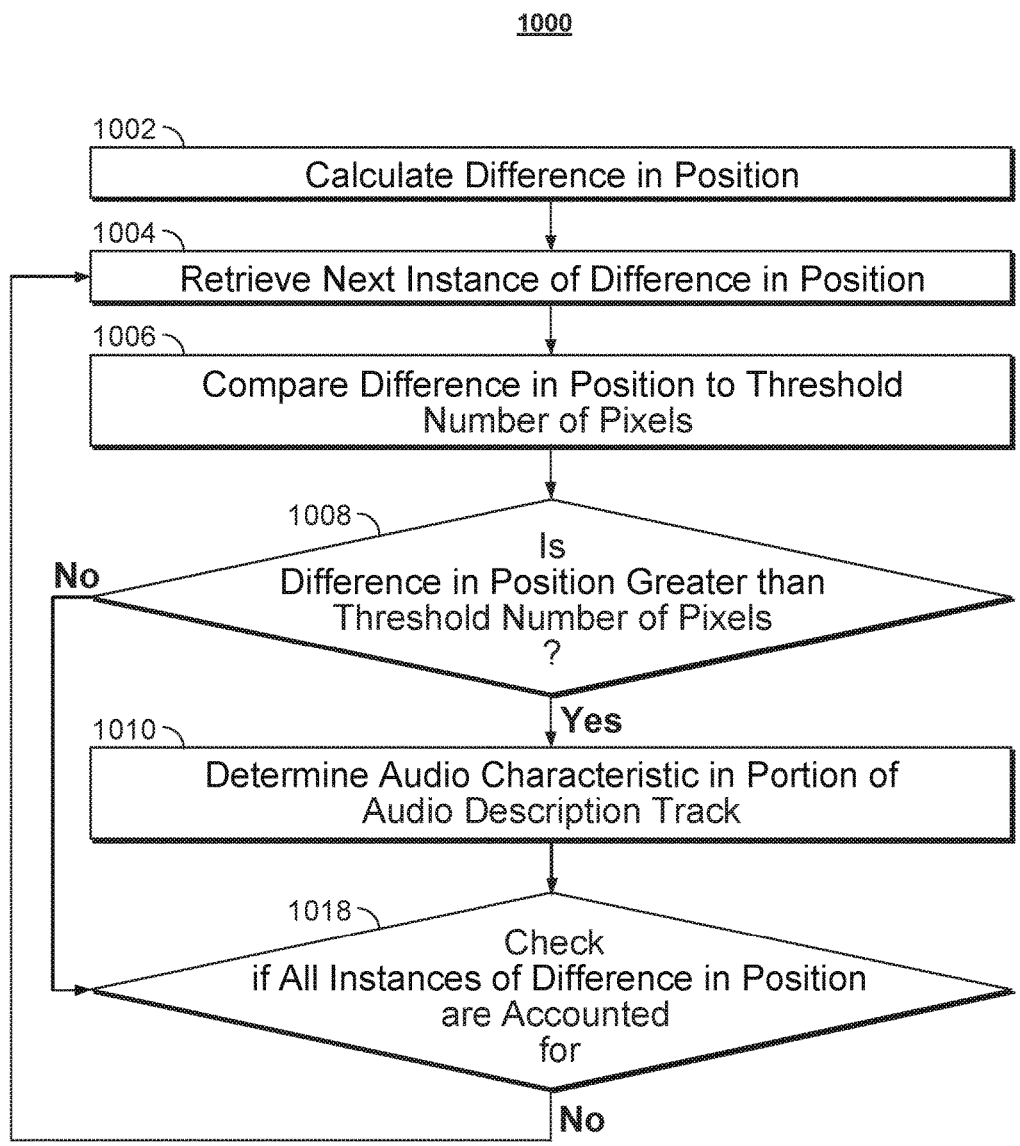

FIGS. 10 and 11 present processes for control circuitry (e.g., control circuitry 404) to compare two values in accordance with some embodiments of the disclosure. In some embodiments this algorithm may be encoded on to non-transitory storage medium (e.g., storage device 408) as a set of instructions to be decoded and executed by processing circuitry (e.g., processing circuitry 406). Processing circuitry may in turn provide instructions to other sub-circuits contained within control circuitry 404, such as the tuning, video generating, encoding, decoding, encrypting, decrypting, scaling, analog/digital conversion circuitry, and the like.

The flowchart in FIG. 10 describes a process 1000 implemented on control circuitry (e.g., control circuitry 404) to compare a difference in position to a threshold number of pixels in accordance with some embodiments of the disclosure. Such a process may be used, for example, when comparing a difference in a characteristic to a threshold difference when the characteristic is position and the threshold difference is a number of pixels. Similar processes can be used to compare other values, such as comparing an audio characteristic to a threshold audio characteristic, comparing the difference in position in one subset of pixels to the difference in position in another subset of pixels, etc.

At step 1002, control circuitry 404 to compare a difference in position to a threshold number of pixels will begin based on control circuitry 404 calculating the difference in position. Control circuitry 404 may calculate this number of pixels, for example, when calculating the difference in position between an object in a first video frame and a second video frame. In some embodiments, this may be done either directly or indirectly in response to a user action or input (e.g., from signals received by control circuitry 404 or user input interface 410). For example, the process may begin directly in response to control circuitry 404 receiving signals from user input interface 410, or control circuitry 404 may prompt the user to confirm their input using a display (e.g., by generating a prompt to be displayed on display 412) prior to running the algorithm.

At step 1004, control circuitry 404 proceeds to retrieve the next instance of the difference in position from stored memory. In some embodiments control circuitry 404 may receive a single primitive data structure that represents the value of the difference in position. In some embodiments the value may be stored as part of a larger data structure, and control circuitry 404 may retrieve the value by executing appropriate accessor methods to retrieve the value from the larger data structure.

At step 1006, control circuitry 404 proceeds to compare the value of the difference in position to the stored value of the threshold number of pixels. In some embodiments, the value of the threshold number of pixels may be stored (e.g., on storage device 408) prior to beginning the process. In some embodiments the value of the threshold number of pixels may also be retrieved for each and every instance of the difference in position, and the value of the threshold number of pixels may change from iteration to iteration. In some embodiments, control circuitry 404 may directly compare the value of the threshold number of pixels with the value of the difference in position by accessing the values respectively from memory and performing a value comparison. In some instances, control circuitry 404 may call a comparison function (e.g., for object to object comparison) to compare the difference in position and the threshold number of pixels.

At step 1008, control circuitry 404 compares the values of the difference in position and the threshold number of pixels to determine if the value of the difference in position is greater than the value of the threshold number of pixels. If the condition is satisfied, the algorithm may proceed to step 1010; if the condition is not satisfied, the algorithm may proceed to step 1018 instead.

At step 1010, control circuitry 404 executes a subroutine based on the condition at step 1008 being satisfied. For example, this subroutine may be determining an audio characteristic in a portion of an audio description track. After the subroutine is executed, the algorithm may proceed to step 1018 where it is determined if all instances of the difference in position are accounted for and further iterations are needed.

At step 1018, control circuitry 404 checks if all instances of the difference in position are accounted for. If all of the instances have been evaluated, control circuitry 404 may terminate. For example, control circuitry 404 may call a function to see if there is a next element of the difference in position. If the function returns true (i.e., there are still instances that need to be processed), control circuitry 404 may proceed to step 1004.

It is contemplated that the descriptions of FIG. 10 may be used with any other embodiment of this disclosure. In addition, the descriptions described in relation to the algorithm of FIG. 10 may be done in alternative orders or in parallel to further the purposes of this disclosure. For example, conditional statements and logical evaluations, such as those at 1008, may be performed in any order or in parallel or simultaneously to reduce lag or increase the speed of the system or method. As a further example, in some embodiments several instances of the difference in position may be evaluated in parallel, using multiple logical processor threads, or the algorithm may be enhanced by incorporating branch prediction. Furthermore, it should be noted that the process of FIG. 10 may be implemented on a combination of appropriately configured software and hardware, and that any of the devices or equipment discussed in relation to FIGS. 2-5 could be used to implement one or more portions of the process.

The pseudocode in FIG. 11 describes a process to compare a difference in position to a threshold number of pixels in accordance with some embodiments of the disclosure.

Such a process may be used, for example, when comparing a difference in a characteristic to a threshold difference when the characteristic is position and the threshold difference is a number of pixels. Similar processes can be used to compare other values, such as comparing an audio characteristic to a threshold audio characteristic, comparing the difference in position in one subset of pixels to the difference in position in another subset of pixels, etc. It will be evident to one skilled in the art that the process described by the pseudocode in FIG. 11 may be implemented in any number of programming languages and a variety of different hardware, and that the style and format should not be construed as limiting, but rather a general template of the steps and procedures that would be consistent with code used to implement some embodiments of this disclosure.

At line 1101, control circuitry 404 runs a subroutine to initialize variables and prepare to compare the difference in position to the threshold number of pixels, which begins on line 1105. For example, in some embodiments control circuitry 404 may copy instructions from non-transitory storage medium (e.g., storage device 408) into RAM or into the cache for processing circuitry 406 during the initialization stage. Additionally, in some embodiments the value of the threshold number of pixels being used for comparison, or a tolerance level for determining if two values are essentially equivalent, may be retrieved, set, and stored at 1101.

At line 1105, control circuitry 404 receives instances of the difference in position. In some embodiments these instances may be retrieved from stored memory. Control circuitry 404 may receive instances of the difference in position by receiving, for example, a pointer to an array of values of the difference in position. In another example, control circuitry 404 may receive an object of a class, such as an iterator object containing elements of the difference in position.

At line 1106, control circuitry 404 iterates through the various instances of the difference in position, if only a single instance is available, the loop will only execute once. This loop may be implemented in multiple fashions depending on the choice of hardware and software language used to implement the algorithm of FIG. 11; for example, this may be implemented as part of a "for" or "while" loop.

At line 1107, control circuitry 404 stores the value of the difference in position into a temporary variable "A." In some embodiments the value of the difference in position will be stored as part of a larger data structure or class, and the value of the difference in position may be obtained through appropriate accessor methods. In some embodiments the difference in position may be converted from a string or other non-numeric data type into a numeric data type by means of an appropriate hashing algorithm. In some embodiments, control circuitry 404 may call a function to perform a comparison of the difference in position to the threshold number of pixels. In some embodiments the difference in position may be encoded as a primitive data structure, and rather than using a temporary variable, the difference in position may be directly used in the comparison at lines 1109.

At line 1108, control circuitry 404 stores the value of the threshold number of pixels into a temporary variable "B." Similar to the difference in position, in some embodiments the value of the threshold number of pixels will be stored as part of a larger data structure or class, and the value of the threshold number of pixels may be obtained through accessor methods. In some embodiments the threshold number of pixels may be converted from a string or other non-numeric data type into a numeric data type by means of an appropriate hashing algorithm, or the threshold number of pixels may be a primitive data structure, and may be directly used in the comparisons at line 1109.

At line 1109, control circuitry 404 compares the value of A to the value of B to see if A is greater than B.

At line 1112, control circuitry 404 executes a subroutine to determining an audio characteristic in a portion of the audio description track if the condition in line 1109 is satisfied.

At line 1114, control circuitry 404 runs a termination subroutine after the algorithm has performed its function. For example, in some embodiments control circuitry 404 may destruct variables, perform garbage collection, free memory or clear the cache of processing circuitry 406.

It will be evident to one skilled in the art that process 1100 described by the pseudocode in FIG. 11 may be implemented in any number of programming languages and a variety of different hardware, and the particular choice and location of primitive functions, logical evaluations, and function evaluations are not intended to be limiting. It will also be evident that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs. For example, in some embodiments break conditions may be placed after line 1112 to speed operation, or the conditional statements may be replaced with a case-switch. In some embodiments, rather than iterating over all instances of the difference in position at step 1106, in some embodiments the code may be rewritten so control circuitry 404 is instructed to evaluate multiple instances of the difference in position simultaneously on a plurality of processors or processor threads, lowering the number of iterations needed and potentially speeding up computation time.

Figure 12:
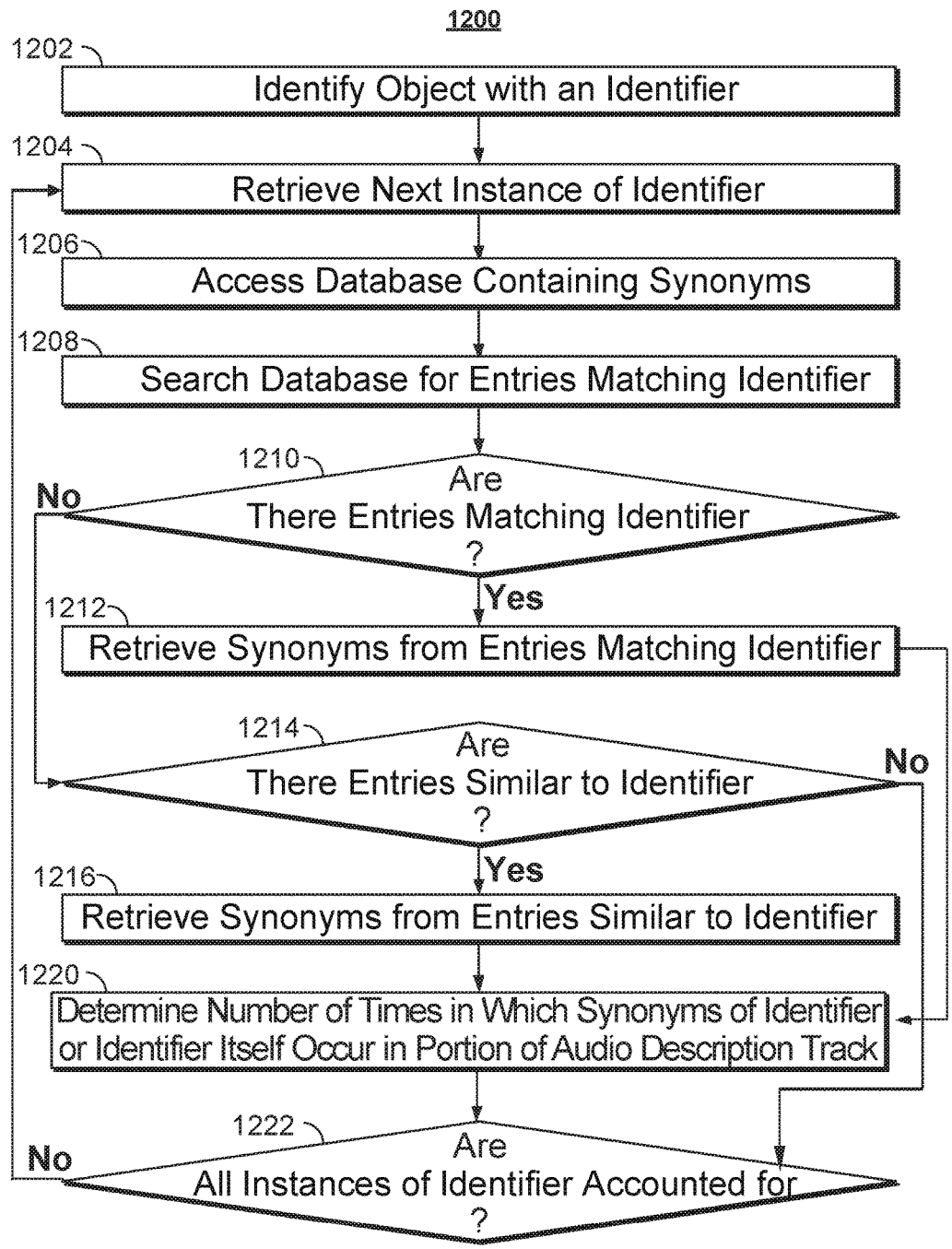

FIGS. 12 and 13 present processes implemented on control circuitry (e.g., control circuitry 404) to search a database and retrieve items from a database in accordance with some embodiments of the disclosure. Similar to the algorithms described by FIGS. 10 and 11, in some embodiments this process may be encoded on to non-transitory storage medium (e.g., storage device 408) as a set of instructions to be decoded and executed by processing circuitry (e.g., processing circuitry 406). Processing circuitry may in turn provide instructions to other sub-circuits contained within control circuitry 404, such as the tuning, video generating, encoding, decoding, encrypting, decrypting, scaling, analog/digital conversion circuitry, and the like.

The flowchart in FIG. 12 describes a process 1200 implemented on control circuitry (e.g., control circuitry 404) to search a database and retrieve synonyms for an identifier in accordance with some embodiments of the disclosure. Similar processes can be used with other types of database, such as databases of facial expressions.

At step 1202, control circuitry 404 to search a database and retrieve synonyms for an identifier will begin based on identifying an object with an identifier. In some embodiments, this may be done either directly or indirectly in response to a user action or input (e.g., from signals received by control circuitry 404 or user input interface 410.)

At step 1204, control circuitry 404 proceeds to retrieve the next instance of the identifier from stored memory. In some embodiments control circuitry 404 may retrieve a single primitive data structure that represents the value of the identifier. In some embodiments control circuitry 404 may retrieve the value from a larger class or data structure.

At step 1206, control circuitry 404 accesses a database containing synonyms of words. In some embodiments, this database may be stored locally (e.g., on storage device 408) prior to beginning the algorithm. In some embodiments the database may also be accessed by using communications circuitry to transmit information across a communications network (e.g., communications network 514) to a database implemented on a remote storage device (e.g., media guidance data source 518).

At step 1208, control circuitry 404 searches database tables for entries matching the identifier. In some embodiments this may be done by comparing a string or integer representing the identifier of the object. In some embodiments control circuitry 404 may submit a general query to the database for table entries matching the identifier, and control circuitry 404 may receive a list of indices or a data structure containing a portion of the database contents. In some embodiments the database may implement a junction table that in turn cross-references entries from other databases. In this case, control circuitry 404 may retrieve indices from a first database that in turn can be used to retrieve information from a second database. Although we may describe control circuitry 404 interacting with a single database for purposes of clarity, it is understood that the algorithm of FIG. 12 may be implemented using multiple independent or cross-referenced databases.

At step 1210, control circuitry 404 determines if there are database entries matching the identifier. In some embodiments control circuitry 404 may receive a signal from the database indicating that there are no matching entries. In some embodiments control circuitry 404 may instead receive a list of indices or data structures with a NULL or dummy value. If control circuitry 404 identifies that there are database entries matching the identifier the algorithm proceeds to step 1212, otherwise the algorithm proceeds to step 1214.

At step 1212, control circuitry 404 executes a subroutine to retrieve synonyms associated with the identifier from the entries matching the identifier. Afterwards, the algorithm may proceed to step 1220.

At step 1214, control circuitry 404 determines if there are database entries similar to the identifier. For example, in some embodiments, if the identifier is encoded as a string with multiple characters, control circuitry 404 may perform additional database queries for similar strings with individual characters replaced, removed or added. In some embodiments control circuitry 404 may also determine if the original query was a commonly misspelled word, and will submit a query with the correct spelling instead. In another example, the identifier may be encoded as an integer; control circuitry 404 may perform additional queries for other integers within a certain range. In some embodiments control circuitry 404 may retrieve database entries similar to the identifier without requiring further queries. If control circuitry 404 identifies that there are database entries similar to the identifier the algorithm proceeds to step 1216; otherwise the algorithm proceeds to step 1222.

At step 1216, control circuitry 404 executes a subroutine to retrieve synonyms from entries similar to identifier. Afterwards, the algorithm may proceed to step 1220.

At step 1220, control circuitry 404 executes a subroutine to determine a number of times in which synonyms of the identifier, or the identifier itself, occur in a portion of an audio description track. Afterwards, the algorithm may proceed to step 1222.

At step 1222, control circuitry 404 determines if all instances of the identifier are accounted for and if further iterations are needed. If further iterations are needed the algorithm will loop back to step 1204 where control circuitry 404 will retrieve the next instance of the identifier. If no further iterations are needed the algorithm may terminate.

It is contemplated that the descriptions of FIG. 12 may be used with any other embodiment of this disclosure. In addition, the descriptions described in relation to process 1200 of FIG. 12 may be done in alternative orders or in parallel to further the purposes of this disclosure. For example, control circuitry 404 may submit multiple queries to the database in parallel, or it may submit multiple queries to a plurality of similar databases in order to reduce lag and speed the execution of process 1200. As a further example, although step 1212 and step 1216 are described as being mutually exclusive, both exact entries and similar entries may be processed for a single instance of the identifier. To further this purpose, in some embodiments step 1210 and step 1214 may be performed in parallel by control circuitry 1204. Furthermore, it should be noted that the process of FIG. 12 may be implemented on a combination of appropriately configured software and hardware, and that any of the devices or equipment discussed in relation to FIGS. 2-5 could be used to implement one or more portions of the algorithm.

The pseudocode in FIG. 13 describes an process to retrieve synonyms for an identifier using a database containing synonyms of words in accordance with some embodiments of the disclosure. Similar processes can used with other types of database, such as databases of facial expressions. It will be evident to one skilled in the art that process 1300 described by the pseudocode in FIG. 13 may be implemented in any number of programming languages and a variety of different hardware, and that the style and format should not be construed as limiting, but rather a general template of the steps and procedures that would be consistent with code used to implement some embodiments of this disclosure.

At line 1301, control circuitry 404 runs a subroutine to initialize variables and prepare to retrieve synonyms for an identifier using a database containing synonyms of words, which begins on line 1305. For example, in some embodiments control circuitry 404 may copy instructions from non-transitory storage medium (e.g., storage device 408) into RAM or into the cache for processing circuitry 406 during the initialization stage.

At line 1305, control circuitry 404 receives instances of the identifier. In some embodiments these instances may be retrieved from stored memory.

At line 1306, control circuitry 404 iterates through the various instances of the identifier; if only a single instance is available, the loop will only execute once. This loop may be implemented in multiple fashions depending on the choice of hardware and software language used to implement the algorithm of FIG. 13; for example, this may be implemented as part of a "for" or "while" loop, in some programming languages. In some embodiments it may be convenient to store the instances of the identifier in a single class or encapsulated data structure that will perform the loop as part of an internal method.

At line 1307, control circuitry 404 queries a database for entries matching the identifier. Depending on how the database is implemented and how the identifier is stored, an intermittent step may be required to convert the identifier into a form consistent with the database. For example, the identifier may encoded into a string or an integer using an appropriate hashing algorithm prior to being transmitted to the database by control circuitry 404 as part of a query. In some embodiments the identifier may be encoded as a primitive data structure, and control circuitry 404 may submit the identifier as a query to the database directly. After querying the database, control circuitry 404 may receive a set of database entries matching the identifier. In some embodiments control circuitry 404 may receive these entries in the form of a data-structure, a set of indices of the database, or a set of indices of another cross-referenced database.

At lines 1308 and 1311, control circuitry 404 will determine if there are any database entries matching the identifier. In some embodiments control circuitry 404 may determine this by checking if the database returned an empty data structure or a NULL value in response to the query in line 1307. If there are matching database entries the algorithm may proceed to line 1309. If there were no matching database entries the algorithm may instead proceed to line 1312.

At line 1309, control circuitry 404 retrieves one or more values of synonyms from the database entries matching the identifier. For example, if control circuitry 404 retrieves a list of indices after querying the database in line 1307, in some embodiments control circuitry 404 may retrieve the database entries for synonyms located at the received indices. In some embodiments the indices may point to a larger data structure contained within the database, and control circuitry 404 may retrieve the values of synonyms from within the data structure using appropriate accessor methods. In some embodiments control circuitry 404 may retrieve the values of synonyms and store them in a separate data structure locally (e.g., in storage 408) prior to proceeding further. After retrieving the values of synonyms the algorithm will proceed to line 1310.

At line 1310, control circuitry 404 executes a subroutine to use the values of synonyms and determine a number of times in which a synonym or the identifier itself occur in a portion of an audio description track. Afterwards, the algorithm may proceed to line 815.

At lines 1313 and 1316, control circuitry 404 determines if there are any database entries similar to the identifier. For example, the identifier may be represented by an object of a class. Control circuitry 404 may call a function to perform a fuzzy comparison (e.g., a comparison to identify similar objects of the class) by comparing specific fields of the class or by performing approximate string matching on data related to the identifier. If database entries similar to the identifier are found by control circuitry 404 then the algorithm proceeds to line 1314. If control circuitry 404 does not find matching entries (e.g., a query to the database returns a NULL value), the algorithm proceeds to line 1318.

At line 1314, control circuitry 404 retrieves one or more values of synonyms from the database entries that are similar to the identifier. Similar processes described in relation to line 1309 may be used. After retrieving the values of synonyms the algorithm will proceed to line 1315.

At line 1315, control circuitry 404 executes a subroutine to use the values of synonyms and determine a number of times in which a synonym or the identifier itself occur in a portion of an audio description track. Afterwards, the algorithm may proceed to line 1318.

At line 1318, control circuitry 404 executes a termination subroutine after the algorithm has performed its function and all instances of the identifier have been processed and checked against the database. For example, in some embodiments control circuitry 404 may destruct variables, perform garbage collection, free memory or clear the cache of processing circuitry 406.

It will be evident to one skilled in the art that process 1300 described by the pseudocode in FIG. 13 may be implemented in any number of programming languages and a variety of different hardware, and the particular choice and location of primitive functions, logical evaluations, and function evaluations are not intended to be limiting. It will also be evident that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs. For example, in some embodiments the code may be re-written so control circuitry 404 is instructed to evaluate multiple instances of the identifier and submit multiple database queries simultaneously using a plurality of processors or processor threads. It is also understood that although we may describe control circuitry 404 interacting with a single database, this is only a single embodiment described for illustrative purposes, and the algorithm of FIG. 13. may be implement using multiple independent or cross-referenced databases. For example, a database stored locally (e.g., on storage 408) may index or cross-reference a database stored remotely (e.g., media guidance data source 518), which may be accessible through any number of communication channels (e.g., communications network 514). In some embodiments, this may allow control circuitry 404 to utilize a look-up table or database front-end efficiently stored on a small local drive to access a larger database stored on a remote server on demand.

Similar processes to those described in relation to process 600 and process 700 can be used to automatically generate an audio description track of a media asset, or to supplement an audio description track with additional audio content. Automatically generating an audio description track may be helpful because it may not require a human to create audio content for the audio description track. This may be helpful because visually impaired users represent a subset of the overall population of users, and accordingly resources for human-produced audio description tracks may be limited.

Figure 14:
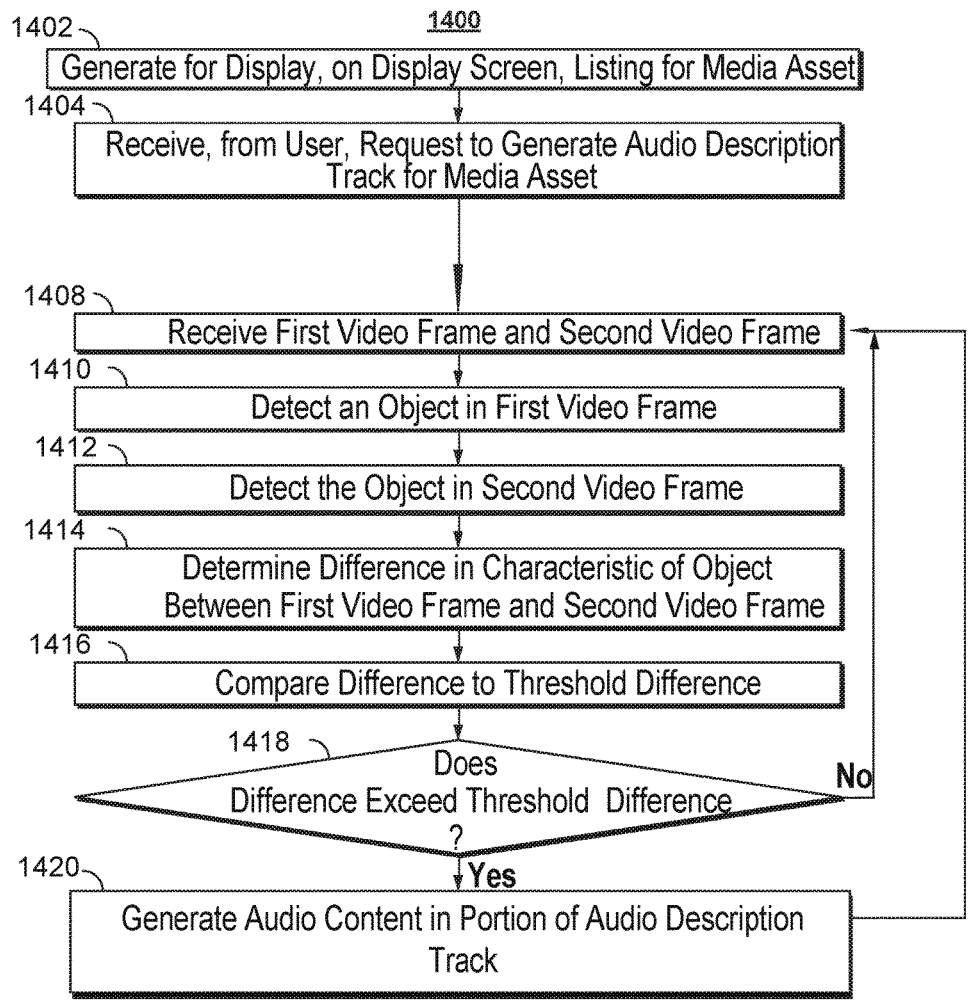
FIG. 14 is a flow chart of a process implemented on control circuitry for automatically generating an audio description track of a media asset in accordance with some embodiments of the disclosure.

The flow chart in FIG. 14 describes a process 1400 implemented on control circuitry 404 for automatically generating an audio description track of a media asset in accordance with some embodiments of the disclosure. Any of the description, examples, or variants discussed in reference to process 600 and/or process 700 may apply to process 1400. Any steps described in relation to process 1400 may be combined with any steps described in relation to process 600 and/or process 700. For example, control circuitry 404 may generate audio content in the audio description track while evaluating the audio description track. For example, control circuitry 404 may supplement the audio description track with audio content if it determines during evaluation of the audio description track that the audio description track is lacking audio content.

Process 1400 begins at step 1402. At step 1402, control circuitry 404 generates for display, on a display screen, a listing for a media asset. Control circuitry 404 then proceeds to step 1404.

To initiate the generation, at step 1404, control circuitry 404 receives a request from a user to generate an audio description of a media asset. As discussed above, in some implementations, instead of or in addition to receiving the request for the user to generate the audio description track, the audio description track is generated at or by a content source (e.g., content source 516) before transmission of the media asset to a user equipment device (e.g., user equipment device 400). In such implementations, the process may begin at step 1408, and it should be understood that while the following description discusses control circuitry 404, certain steps may be performed by control circuitry of the content source.

At step 1408, control circuitry 404 receives a first video frame (e.g., first video frame 104) of the plurality of video frames. At step 1408, control circuitry 404 also receives a second video frame (e.g., second video frame 108) of the plurality of video frames. The first video frame is ordered before the second video frame in the plurality of sequentially ordered video frames. The first video frame corresponds to a first time and the second video frame corresponds to a second time. Control circuitry 404 then proceeds to step 1410.

At step 1410, control circuitry 404 detects an object in the first video frame. Control circuitry 404 then proceeds to step 1412.

At step 1412, control circuitry 404 detects, in the second video frame, the object (e.g., object 134) that control circuitry 404 detected in step 1410. Control circuitry 404 then proceeds to step 1414.

At step 1414, control circuitry 404 determines a difference in a characteristic of the object between the first video frame and the second video frame. Control circuitry 404 then proceeds to step 1416.

At step 1416, control circuitry 404 compares the difference in the characteristic of the object between the first video frame and the second video frame to a threshold difference. Control circuitry 404 then proceeds to step 1418.

At step 1418, control circuitry 404 determines whether the difference in the characteristic of the object exceeds the threshold difference. If the difference does not exceed the threshold difference, control circuitry 404 proceeds to step 1408, or terminates process 1400. If the difference does exceed the threshold difference, control circuitry 404 proceeds to step 1420.

In comparing the difference in the characteristic of the object to a threshold difference, control circuitry 404 may determine whether the difference in the characteristic of the object is significant. If control circuitry 404 determines that the difference in the characteristic of the object is significant, it may be desirable to generate audio content in the audio description track corresponding to this significant change.

At step 1420, control circuitry 404 generates audio content in a portion of the audio description track. The portion of the audio description track corresponds to a range of time that includes the first time and the second time. As discussed above, the first video frame corresponds to the first time in the run-time of the media asset, and the second video frame corresponds to the second time in the run-time of the media asset. In some implementations, the range of time is equal to the range of time from the first time to the second time. In certain implementations, the range of time extends a certain amount of time before the first time. In some implementations, the range of time extends a certain amount of time after the second time. In certain implementations, the range of time extends a first amount of time before the first time and a second amount of time after the second time. The first amount of time and the second amount of time may be the same or different. In some implementations, the range of time depends on audio content in the audio description track. In some implementations, the range of time may be the same as the range of time in which the scene containing the first video frame and the second video frame occurs. Control circuitry 404 may use any suitable method for determining at which time in the portion of the audio description track to generate the audio content. For example, control circuitry 404 may, by default, generate the audio content at the first time, or by default generate the audio content at the second time, or by default generate the audio content at a time in between (e.g., halfway) between the first time and the second time. If control circuitry 404 detects that audio content already exists at one time in the portion of the audio description track, control circuitry 404 may generate the audio content at another time. If control circuitry 404 detects that audio content already exists at one time in the standard audio track of the media asset, control circuitry 404 may generate the audio content at another time.

The audio content generated corresponds to the object and/or the difference in the characteristic. For example, if the object is a car and the characteristic is a change in position, for example, a movement to the right, the audio content may be "The car moves to the right." For example, if the object is a character named Jason Bourne and the characteristic is a change in emotion, for example, a change from happy to angry, the audio content may be "Jason Bourne feels angry" or "Jason Bourne stops feeling happy" or "Jason Bourne changes from feeling happy to feeling angry." In some implementations, control circuitry 404 accesses templates for the audio content to generate the audio content. For example, one template for a change in position may be "_____ moves _____," and control circuitry 404 fills in the appropriate object in the first blank and the appropriate movement direction in the second blank. In certain implementations, control circuitry 404 accesses a database containing words appropriate for different objects or changes in characteristic. For example, the database may indicate that the word "drive" is appropriate to use if the object is a car and the word "feel" is appropriate to use for a change in emotion. To generate the audio content, control circuitry 404 may use a text-to-speech generator and insert the generated speech at the appropriate time in the audio description track. Control circuitry 404 then proceeds to step 1408 to repeat the process for different video frames, or terminates process 1400.

In some implementations, instead of or in addition to steps 1410-1418, control circuitry 404 may detect the object in the first video frame and detect that the object is not present in the second video frame, or detect the object in the second video frame and detect that the object is not present in the first video frame. In detecting that the object is present in one video frame and not present in another video frame, control circuitry 404 may determine that a significant change has taken place that should be reflected in the audio description track. In such a situation, control circuitry 404 may generate audio content at step 1420 corresponding to the appearance or disappearance of the object. For example, the audio content may be, "The car moves off screen," or "Jason Bourne leaves the room."

As discussed above, in some implementations, instead of or in addition to receiving the request from the user to generate the audio description track, the audio description track is generated at or by a content source (e.g., content source) 516 before transmission of the media asset to a user equipment device (e.g., user equipment device 400). In this way, the audio description track may be available to the user without needing to first request that the audio description track be generated.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for automatically evaluating an audio description track of a media asset, the method comprising:
   initializing a rating of an audio description track of a media asset to a default value, wherein:
      the media asset comprises a plurality of sequentially ordered video frames and an audio track corresponding to the plurality of video frames;
      the audio description track comprises audio content that supplements the audio track with audio descriptions of visual events occurring in the media asset; and
      the rating of the audio description track indicates a numerical evaluation of how comprehensively the audio description track describes the visual events occurring in the media asset;
   receiving a first video frame and a second video frame of the plurality of sequentially ordered video frames, wherein:
      the first video frame is ordered before the second video frame in the plurality of sequentially ordered video frames;
      the first video frame corresponds to a first time; and
      the second video frame corresponds to a second time;
   detecting an object in the first video frame;
   detecting the object in the second video frame;
   determining a difference in a characteristic of the object between the first video frame and the second video frame;
   comparing the difference to a threshold difference;
   based on the difference exceeding the threshold difference, determining an audio characteristic in a portion of the audio description track that corresponds to a range of time that includes the first time and the second time;
   comparing the audio characteristic to a threshold audio characteristic;
   based on comparing the audio characteristic to a threshold audio characteristic, adjusting the rating of the audio description track by a unit.

2. The method of claim 1, wherein detecting the object in the first video frame comprises:
   detecting a first object and a second object in the first video frame;
   determining a first subset of a plurality of pixels of a display screen in which the first object occurs in the first video frame;
   determining a second subset of the plurality of pixels in which the second object occurs in the first video frame;
   determining that a number of pixels in the first subset is greater than a number of pixels in the second subset; and
   selecting the first object to be the object.

3. The method of claim 1, wherein detecting the object in the first video frame comprises:
   detecting a first object and a second object in the first video frame;
   receiving metadata associated with the first video frame;
   detecting an identifier of the first object in the metadata; and
   selecting the first object to be the object.

4. The method of claim 3, wherein the first object is a character, and detecting the identifier of the first object in the metadata comprises detecting at least one of a name of the character and an actor who plays the character.

5. The method of claim 1, wherein determining a difference in a characteristic of the object between the first video frame and the second video frame comprises determining a difference in a position of the object between the first video frame and the second video frame.

6. The method of claim 5, wherein:
   determining the difference in the characteristic of the object between the first video frame and the second video frame comprises:
   assigning an address to each pixel of a plurality of pixels of the display screen, wherein each address comprises a horizontal address corresponding to a horizontal position on the display screen of each pixel and a vertical address corresponding to a vertical position on the display screen of each pixel;
   determining a first subset of the plurality of pixels in which the object occurs in the first video frame;
   determining a second subset of the plurality of pixels in which the object occurs in the second video frame;
   calculating a first horizontal mean, wherein the first horizontal mean corresponds to a mean of horizontal addresses of the first subset;
   calculating a first vertical mean, wherein the first vertical mean corresponds to a mean of vertical addresses of the first subset;
   calculating a second horizontal mean, wherein the second horizontal mean corresponds to a mean of horizontal addresses of the second subset;
   calculating a second vertical mean, wherein the second vertical mean corresponds to a mean of vertical addresses of the second subset;
   subtracting the second horizontal mean from the first horizontal mean to obtain a horizontal difference;
   subtracting the second vertical mean from the first vertical mean to obtain a vertical difference; and
   comparing the difference to the threshold difference comprises:
   comparing an absolute value of the horizontal difference to a threshold number of pixels;
   comparing an absolute value of the vertical difference to the threshold number of pixels; and
   determining the difference to exceed the threshold difference if the absolute value of the horizontal difference or the absolute value of the vertical difference exceeds the threshold number of pixel.

7. The method of claim 1, further comprising based on the audio characteristic not exceeding the threshold audio characteristic, generating audio content corresponding to at least one of the object and the characteristic of the object in the portion of the audio description track.

8. The method of claim 1, wherein determining the audio characteristic in the portion of the audio description track comprises determining a volume of audio content in the portion of the audio description track.

9. The method of claim 1, wherein determining the audio characteristic in the portion of the audio description track comprises:
identifying the object with an identifier;
accessing a database of synonyms;
retrieving from the database a plurality of keywords for the identifier, wherein the keywords are synonyms for the identifier; and
determining a number of times in which a keyword of the plurality of keywords or the identifier occurs in the portion of the audio description track.

10. The method of claim 1, wherein generating for display the indication of the rating comprises generating for display at least one of a word, icon, size of the listing, color of the listing, and presence of the listing corresponding to the rating.

11. A system for automatically evaluating an audio description track of a media asset, the system comprising:
communication circuitry; and
control circuitry configured to:
initialize a rating of an audio description track of a media asset to a default value, wherein:
the media asset comprises a plurality of sequentially ordered video frames and an audio track corresponding to the plurality of video frames;
the audio description track comprises audio content that supplements the audio track with audio descriptions of visual events occurring in the media asset; and
the rating of the audio description track indicates a numerical evaluation of how comprehensively the audio description track describes the visual events occurring in the media asset;
receive, via the communication circuitry, a first video frame and a second video frame of the plurality of sequentially ordered video frames, wherein:
the first video frame is ordered before the second video frame in the plurality of sequentially ordered video frames;
the first video frame corresponds to a first time; and
the second video frame corresponds to a second time;
detect an object in the first video frame;
detect the object in the second video frame;
determine a difference in a characteristic of the object between the first video frame and the second video frame;
compare the difference to a threshold difference;
based on the difference exceeding the threshold difference, determine an audio characteristic in a portion of the audio description track that corresponds to a range of time that includes the first time and the second time;
compare the audio characteristic to a threshold audio characteristic;
based on comparing the audio characteristic to a threshold audio characteristic, adjust the rating of the audio description track by a unit.

12. The system of claim 11, wherein the control circuitry, when detecting the object in the first video frame, is configured to:
detect a first object and a second object in the first video frame;
determine a first subset of a plurality of pixels of a display screen in which the first object occurs in the first video frame;
determine a second subset of the plurality of pixels in which the second object occurs in the first video frame;
determine that a number of pixels in the first subset is greater than a number of pixels in the second subset; and
select the first object to be the object.

13. The system of claim 11, wherein the control circuitry, when detecting the object in the first video frame, is configured to:
detect a first object and a second object in the first video frame;
receive metadata associated with the first video frame;
detect an identifier of the first object in the metadata; and
select the first object to be the object.

14. The system of claim 13, wherein the first object is a character, and detecting the identifier of the first object in the metadata comprises detecting at least one of a name of the character and an actor who plays wait the character.

15. The system of claim 11, wherein the control circuitry, when determining a difference in a characteristic of the object between the first video frame and the second video frame is configured to determine a difference in a position of the object between the first video frame and the second video frame.

16. The system of claim 15, wherein the control circuitry, when determining the difference in the characteristic of the object between the first video frame and the second video frame is configured to:
assign an address to each pixel of a plurality of pixels of the display screen, wherein each address comprises a horizontal address corresponding to a horizontal position on the display screen of each pixel and a vertical address corresponding to a vertical position on the display screen of each pixel;
determine a first subset of the plurality of pixels in which the object occurs in the first video frame;
determine a second subset of the plurality of pixels in which the object occurs in the second video frame;
calculate a first horizontal mean, wherein the first horizontal mean corresponds to a mean of horizontal addresses of the first subset;
calculate a first vertical mean, wherein the first vertical mean corresponds to a mean of vertical addresses of the first subset;
calculate a second horizontal mean, wherein the second horizontal mean corresponds to a mean of horizontal addresses of the second subset;
calculate a second vertical mean, wherein the second vertical mean corresponds to a mean of vertical addresses of the second subset;
subtract the second horizontal mean from the first horizontal mean to obtain a horizontal difference;
subtract the second vertical mean from the first vertical mean to obtain a vertical difference; and
compare the difference to the threshold difference comprises:
compare an absolute value of the horizontal difference to a threshold number of pixels;
compare an absolute value of the vertical difference to the threshold number of pixels; and
determine the difference to exceed the threshold difference if the absolute value of the horizontal difference or the absolute value of the vertical difference exceeds the threshold number of pixel.

17. The system of claim 11, wherein the control circuitry is further configured to based on the audio characteristic not exceeding the threshold audio characteristic, generating audio content corresponding to at least one of the object and the characteristic of the object in the portion of the audio description track.

18. The system of claim 11, wherein the control circuitry, when determining the audio characteristic in the portion of the audio description track is configured to determine a volume of audio content in the portion of the audio description track.

19. The system of claim 11, wherein the control circuitry, when determining the audio characteristic in the portion of the audio description track is configured to:
- identify the object with an identifier;
- access a database of synonyms;
- retrieve from the database a plurality of keywords for the identifier, wherein the keywords are synonyms for the identifier; and
- determine a number of times in which a keyword of the plurality of keywords or the identifier occurs in the portion of the audio description track.

20. The system of claim 11, wherein the control circuitry, when generating for display the indication of the rating is configured to generate for display at least one of a word, icon, size of the listing, color of the listing, and presence of the listing corresponding to the rating.

* * * * *